(12) United States Patent
Zhang

(10) Patent No.: US 7,260,403 B1
(45) Date of Patent: Aug. 21, 2007

(54) METHOD AND SYSTEM FOR DYNAMICALLY ROUTING VOICE CALLS TO ONE OF A PLURALITY OF ASSOCIATED SUBSCRIBER TERMINALS

(75) Inventor: Baoquan Zhang, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 347 days.

(21) Appl. No.: 10/999,279

(22) Filed: Nov. 30, 2004

(51) Int. Cl.
*H04Q 7/20* (2006.01)
(52) U.S. Cl. .................... 455/445; 455/433; 455/435.1
(58) Field of Classification Search ................ 455/445, 455/456.1, 458, 417
See application file for complete search history.

(56) References Cited

U.S. PATENT DOCUMENTS 6,625,457 B1 * 9/2003 Raith ...................... 455/456.1
2002/0068580 A1 * 6/2002 Bala et al. ................. 455/456
2003/0008642 A1 * 1/2003 Punjabi ...................... 455/417
2004/0203926 A1 * 10/2004 Ruutu et al. ............. 455/456.1
2005/0113108 A1 * 5/2005 Kadakia et al. .......... 455/456.1

* cited by examiner

*Primary Examiner*—Temica Beamer

(57) ABSTRACT

A system and method for carrying out a dynamic-routing service is provided. The system includes a service control point ("SCP") that is operable to provide routing instructions for the plurality of subscriber terminals. And each of the plurality of subscriber terminals has a subscriber address and an associated call history. In carrying out a dynamic-routing service, the SCP receives a request for routing instructions for terminating a voice call to a call-subscriber address of the plurality of subscriber addresses. Responsively, the SCP selects from the plurality of subscriber addresses a delivery address for terminating the voice call to based on the call histories associated with the plurality of subscriber addresses. After selecting the delivery address, the SCP develops routing instructions for terminating the voice call to the delivery address, and then provides the routing instructions for terminating the voice call to the delivery address.

30 Claims, 14 Drawing Sheets

METHOD AND SYSTEM FOR DYNAMICALLY ROUTING VOICE CALLS TO ONE OF A PLURALITY OF ASSOCIATED SUBSCRIBER TERMINALS

BACKGROUND

1. Field

The present invention relates to communications and, more particularly, to a method and system for carrying out a dynamic-routing service for routing voice calls to one of a plurality of associated subscriber terminals.

2. Description of Related Art

Recent advances in telecommunications technology have allowed a wide array of enhanced telecommunication services to be made available to subscribers. Examples of such services include abbreviated dialing, which allows a subscriber to reach a party by dialing less than the entire telephone number of that party; call forwarding, in which calls directed to the subscriber may be forwarded to another line; terminating call screening, which allows the subscriber to specify certain times during which all or selected incoming calls are to be rejected; and originating call screening, in which calls to certain telephone numbers are barred. In general, enhanced telecommunications services ("services") encompass those call features that do more than simply place or terminate telephone calls as dialed.

To enable these services, telecommunications networks typically carry "signals" to set-up, maintain and tear down such communications in addition to voice and/or data content communicated between calling and called parties. These signals monitor the status of the lines, indicate the arrival of incoming calls, and carry the information needed to route the voice and/or data content through the telecommunications networks.

Most telecommunications networks use out-of-band signaling, i.e., the signals are transmitted over a signaling network that is separate from a circuit-switched network that carries the voice and data content. Thus, the signals carried on the separate signaling network are used to control the switches in the circuit-switched network to set up, maintain, and tear down the circuit between the calling and called parties. Currently, Signaling System 7 ("SS7") is the most commonly used signaling system used to carry out these function.

In addition to SS7, most telecommunications networks in the United States have adopted an advanced intelligent network ("AIN") standard approach to simplify signaling network architecture and provide a standardized messaging scheme. The AIN standards are embodied in Bellcore's AIN Release 0.1 and AIN Release 0.2.

Under the AIN approach, the switches do not have to have a great deal of "intelligence" built in to them, but rather, are focused on switching responsibilities. Control information and call processing logic for the switches, usually referred to as "service logic," resides in one or more databases in a central network location instead of in the multitude of switches. This approach alleviates an otherwise significant burden on a telecommunications provider when updating services or adding new services to its telecommunications network. Instead of updating software and databases on all of its many switches, the telecommunications provider may update the databases at the central network location.

A service control point ("SCP") provides an interface to these databases. The databases may reside within the SCP or other computers on the telecommunications network. Unlike the switches, the SCP has a great deal of intelligence (e.g., software, firmware, and/or hardware logic) built into it to carry out the service logic to control the multitude of switches.

The centralization at the SCP and the standardized message set allows an SCP to control a large number of switches, which are generally referred to as service switching points ("SSPs") in AIN parlance. Using the standardized messages scheme, the SCP and the switches can exchange information to monitor the status of the lines, indicate the arrival of incoming and outgoing calls, and route the voice and/or data content, for instance.

The SSPs signal the SCP for guidance at predefined "trigger points" in the call processing. These triggers can occur either when the SSP is attempting to originate a call or attempting to terminate a call. The query signal from the SSP passes a set of relevant parameters, in a predefined format, to the SCP. Such parameters can include the calling party's telephone number and the called party's telephone number, for example. When the SCP receives the query, it executes the appropriate service logic and consults the appropriate databases to obtain the information and instructions needed to provide the intelligent network service. The SCP then sends a response message to the SSP instructing it how to complete the call and to provide the service.

Because of the large number of SSPs and other network elements connected to the signaling network, the signaling network typically includes one or more signal transfer points ("STPs") that route the signals through the signaling network. Thus, the signals between SSPs and the SCP are often routed through one or more STPs. When SS7 signaling is used, signals may be routed to specific network elements based on their point codes. Alternatively, signals may be routed using global title translation ("GTT"), in which STPs route signals to their intended destinations without the need for point codes. In particular, when GTT is used, STPs route signals based on information contained in their payloads.

Wireless telecommunications networks have also been developed on a similar model. In wireless networks, switching is performed by mobile switching centers (MSCs). Each MSC typically controls one or more base stations or base transceiver stations (BTSs), sometimes via one or more base station controllers (BSCs). Each BTS provides a wireless coverage area within which mobile stations can communicate with the BTS over an air interface. The mobile stations can be cellular or PCS telephones, or other devices. Different formats may be used for communicating over this air interface. At present, the most commonly used formats in the United States are Time Division Multiple Access (TDMA), Global System for Mobile Communications (GSM), Code Division Multiple Access (CDMA), and Advanced Mobile Phone Service (AMPS).

Each mobile station typically has a "home" wireless network, in which a home location register (HLR) serves as a centralized repository of information about the mobile station. Typically, the HLR contains a service profile for the mobile station, the last reported location of the mobile station, and the current status of the mobile station, such as whether it is active or inactive. The service profile indicates the enhanced services the mobile station subscribes to.

Mobile stations typically identify themselves to wireless networks using one or more types of identification numbers. Each mobile station typically has a 10-digit Mobile Identification Number (MIN). The MIN may be, but need not be, the same as the directory number that would be dialed to reach the mobile station. Thus, a mobile station may also have a Mobile Directory Number (MDN) different from its MIN. Each mobile station also typically has a unique 32-bit Electronic Serial Number (ESN). Other identifiers, such as a mobile station identifier (MSID) and a mobile equipment identifier (MEID), may be used in addition to or in lieu of the MIN and MDN.

When an MSC needs to find information about a mobile station, such as where it is located or what services it subscribes to, it queries the HLR corresponding to that mobile station. Thus, to inquire about a mobile station that is roaming, i.e., operating on a network other than its home network, the MSC queries an HLR that is outside of its network. Typically, these queries are routed to the appropriate HLR based on the mobile station's MIN, MDN, MSID, MEID, etc. For example, the MSC may reference internal translation tables to determine which HLR to query for the MIN, MDN, MSID, MEID, etc, of the mobile station. Alternatively, STPs may route queries to the appropriate HLR using GTT, based on the MIN MDN, MSID, MEID, etc.

In a manner analogous to the AIN approach used in wireline networks, an MSC may also query a wireless intelligent network (WIN) SCP for call processing instructions, in the course of either originating a call from or terminating a call to the mobile station. Such queries can arise from trigger points set by the mobile station's service profile that the MSC downloaded from the mobile station's HLR. Moreover, an MSC uses such queries to obtain the call processing instructions needed to provide enhanced telecommunications services to the mobile station. In response to such queries, the WIN SCP will typically execute the appropriate service logic and consult the mobile station's service profile to formulate the call processing instructions that the WIN SCP then sends to the MSC.

The Telecommunications Industry Association/Electronics Industry Association (TIA/EIA) has developed a number of interim standards that specify how this signaling between MSCs, HLRs, WIN SCPs, and other network elements, should occur. In particular, most wireless networks in the United States use one of the revisions of TIA/EIA Interim Standard 41 ("IS-41"). The IS-41 signaling is typically run as an application on another signaling system, such as SS7. A recent revision of this Interim Standard, ANSI-41 Rev. D, which was published in July, 1997, is fully incorporated herein by reference. Furthermore, extensions to ANSI-41D or WIN triggers and WIN call processing are included in Interim Standard IS-771, which was published July, 1999, and is fully incorporated herein by reference.

SUMMARY

A system and method for carrying out a dynamic-routing service is provided. The dynamic-routing service may be used for routing a voice call to one of a plurality of subscriber terminals, e.g., a work, home and/or mobile telephone, which are associated with a given subscriber of a telecommunications network. The system may include a service control point ("SCP") that is operable to provide routing instructions for the plurality of subscriber terminals. And each of the plurality of subscriber terminals has a subscriber address and an associated call history. In carrying out a dynamic-routing service, the SCP receives a request for routing instructions for terminating a voice call to a called-subscriber address of the plurality of subscriber addresses. Responsive to the request, the SCP selects from the plurality of subscriber addresses a delivery address for terminating the voice call to. The selection of the delivery address is based on the call histories associated with the plurality of subscriber addresses. After selecting the delivery address, the SCP develops routing instructions for terminating the voice call to the delivery address, and then provides the routing instructions for terminating the voice call to the delivery address.

BRIEF DESCRIPTION OF THE DRAWINGS

Preferred embodiments are described with reference to the following drawings, wherein like reference numerals refer to like elements in the various figures, and wherein.

DETAILED DESCRIPTION

Dynamic-Routing Service Overview

Figure 1:
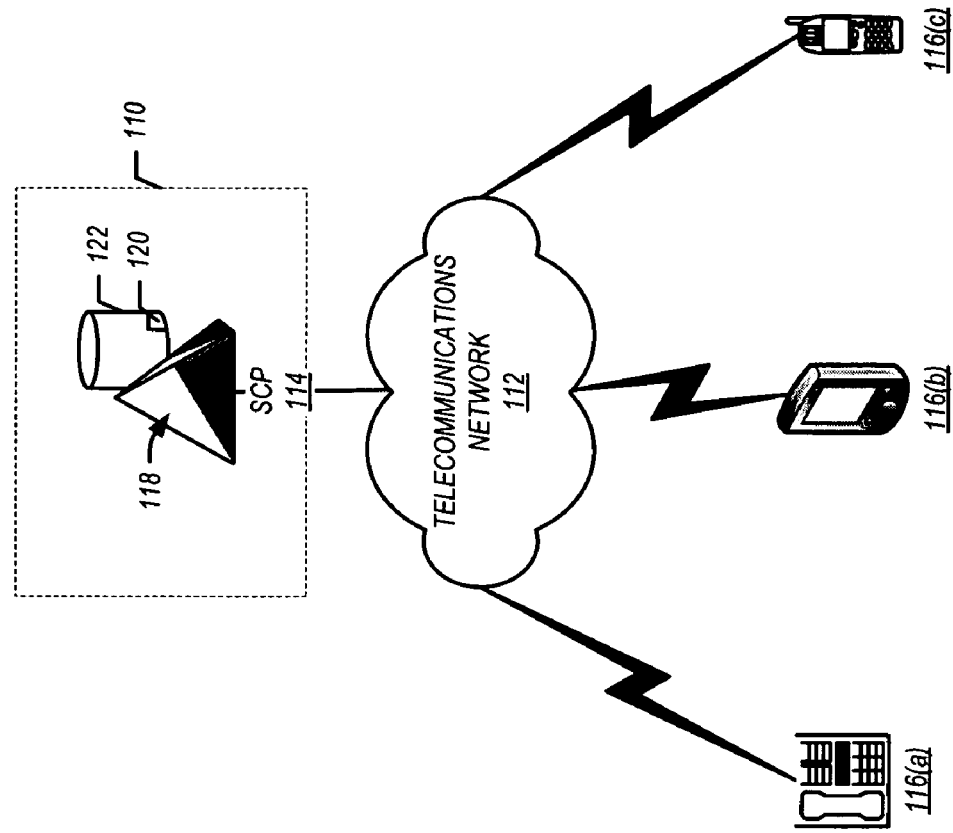
FIG. 1 is a first block diagram illustrating a system for carrying out a dynamic-routing service.

FIG. 1 is a block diagram illustrating a system 110 for carrying out a dynamic-routing service for routing a voice call to one of a plurality of subscriber addresses that are associated with a given subscriber of a telecommunications network, such as telecommunications network 112. Each of the subscriber addresses may correspond to a respective subscriber terminal, such as subscriber terminal 116(*a*), 116(*b*), or 116(*c*).

The system 110 includes a service control point ("SCP") 114 that is operable to provide routing instructions for originating and terminating voice calls to each of the subscriber terminals 116(*a-c*). To facilitate this, the SCP 114 may employ a rules-based engine 118 to determine which one of the subscriber addresses (and, in turn, which one of the subscriber terminals 116(*a-c*)) the voice call is to be routed to.

The rules-based engine 118 may include or be configured to obtain from a data store (not shown) a number of rules to assist in making such determination. Each of the rules, in turn, includes criteria for selecting one of the subscriber addresses (i.e., a "delivery address") based on call histories associated with one or more of the subscriber addresses. Each of the call histories typically contains historical information that is indicative of when its respective subscriber address previously originated and/or terminated a voice call.

The subscriber addresses and associated call histories may be maintained in a call-history data record 120 of a database 122, which is accessible to the SCP 114 and, in turn, the rules-based engine 118. The call-history data record 120 may also include an address of network entities, such as service switching points and mobile switching centers (not shown), to which each of the subscriber terminals 116(*a-c*) used for originating and/or terminating the voice calls.

Figure 2:
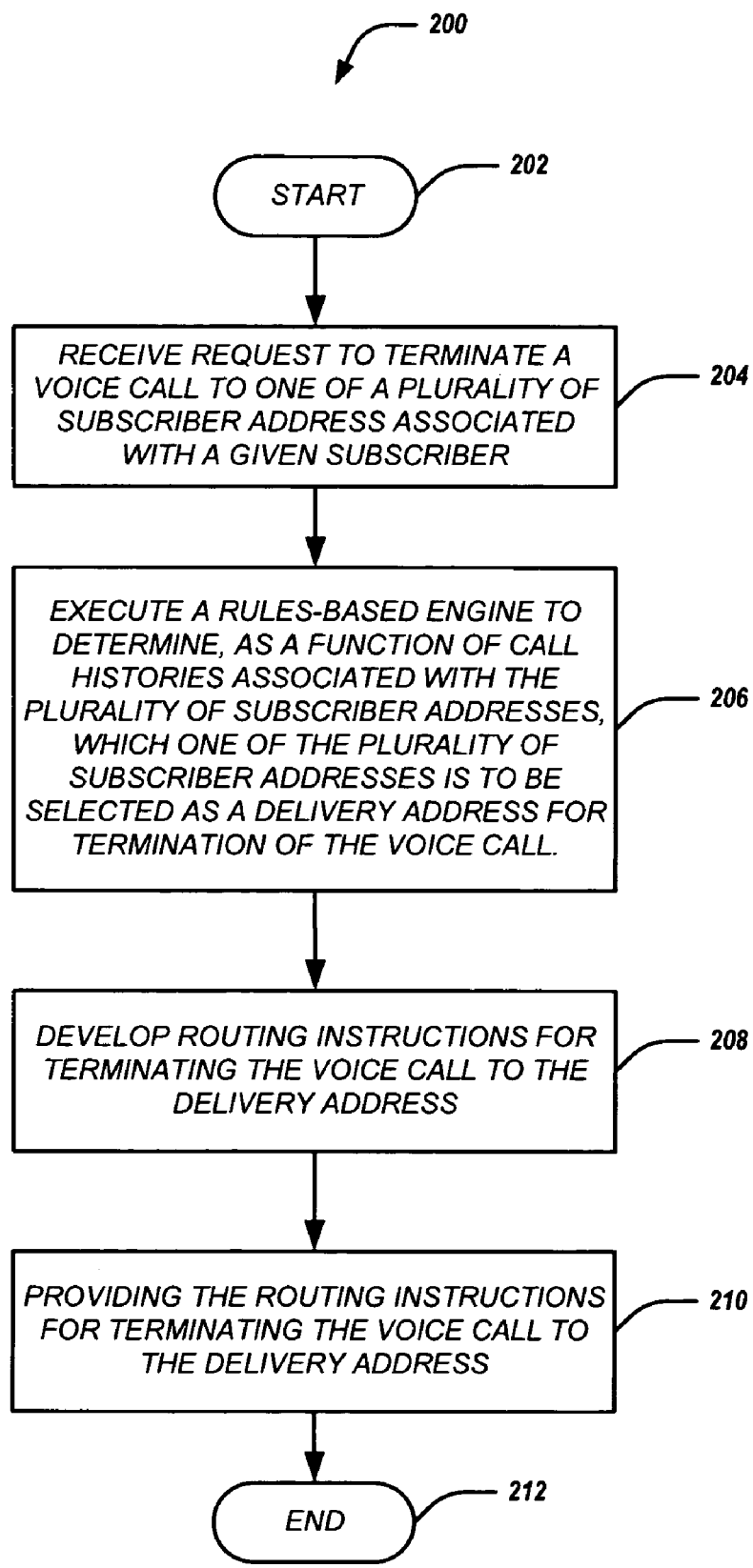
FIG. 2 is a first flow diagram illustrating a flow for carrying out a dynamic-routing service.

FIG. 2 is a flow diagram illustrating a flow 200 for carrying out a dynamic-routing service for routing a voice call to one of a plurality of subscriber addresses that are associated with a given subscriber of a telecommunications network 112. The flow 200 is described in reference to the system 110 illustrated in FIG. 1.

At block 202, the flow is started. The SCP 114, at block 204, may receive from a network entity a request for routing instructions for terminating a voice call to one of the subscriber addresses. Responsive to the request, the SCP 114 executes the rules-based engine to determine the delivery address that the voice call is to be routed to, as shown in block 206. To facilitate such determination, the rules-based engine may evaluate a number of rules, each of which includes criteria for selecting one of the subscriber addresses as function of the call histories.

For example, one of the rules may include criteria for predicting, based on statistical trend analysis of the call-histories, which one of the subscriber addresses is most likely to successfully terminate a voice call. Thus, responsive to the request for routing instructions the rules-based engine 118 may select the subscriber address of most likely to successfully terminate a voice call. This subscriber address then becomes the delivery address.

As described in more detail below, the rules-based engine 118 may evaluate one or more of the rules, the outcome of which may hierarchically or selectively order the subscriber addresses. Accordingly, the delivery address may correspond to a subscriber address that falls at some predetermined or dynamically assigned position within the hierarchically or selectively ordering.

After determining the delivery address, the SCP 114 develops routing instructions for terminating the voice call to the delivery address, as shown in block 208. At block 210, the SCP 114, via its service logic, provides the routing instructions for terminating the voice call to the delivery address. The SCP 114 may use the address or addresses of the network entities stored in the call-history data record 120, if any, for developing routing instructions for terminating the voice call to the delivery address.

As one skilled in the art will recognize, the architecture of system 114 may include more and/or different elements to carry out the dynamic-routing service. In addition, flow 200 may be carried out in a system and/or network other than system 114 and telecommunication network 112. One such system is described below.

Exemplary Architecture

Figure 3:
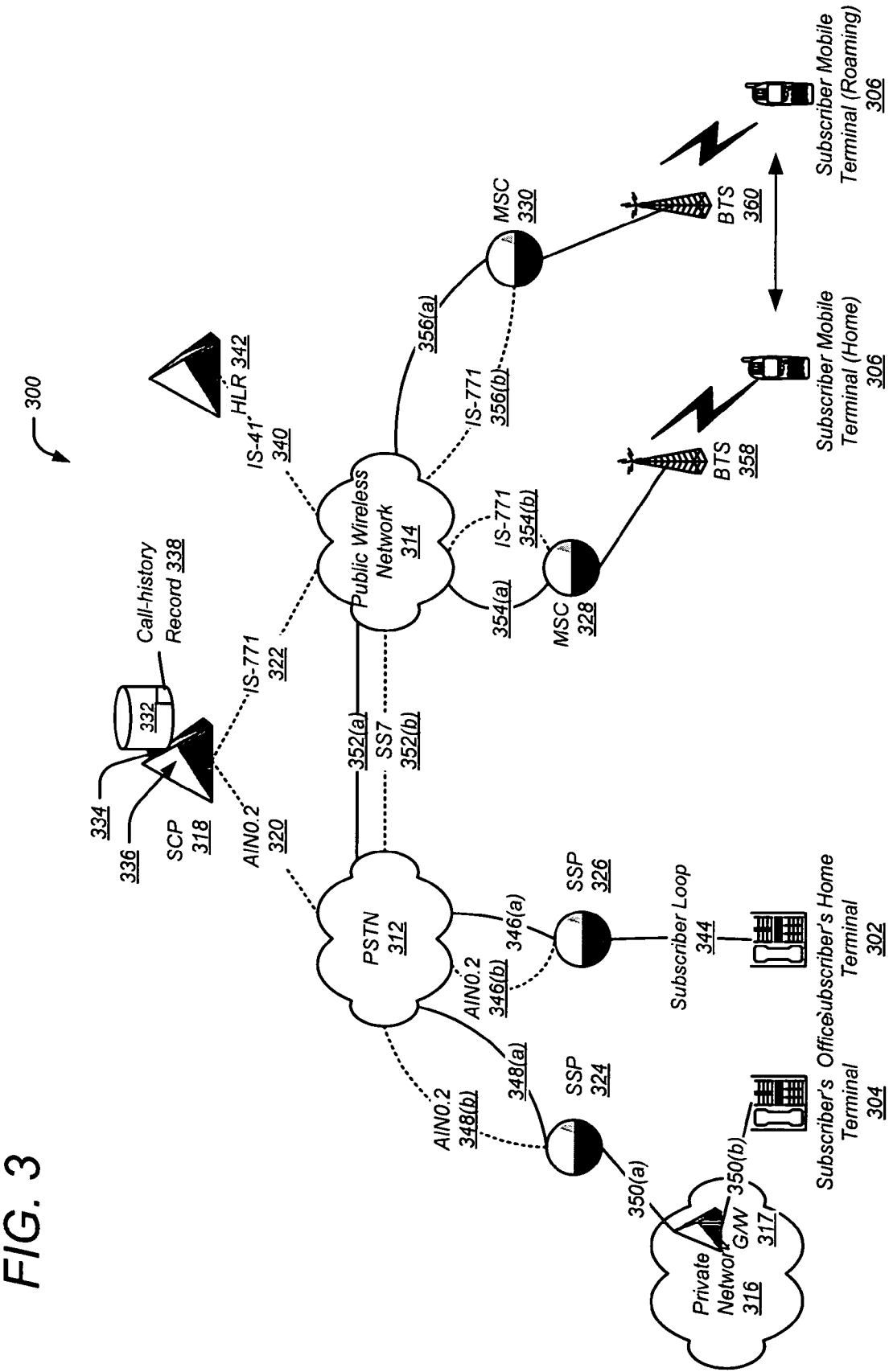
FIG. 3 is a second block diagram illustrating a communications network for carrying out a dynamic-routing service.

FIG. 3 is a block diagram illustrating a communications network, such as telecommunications network 300, for carrying out a dynamic-routing service. The dynamic-routing service may entail routing voice calls to one of a plurality of subscriber addresses that are associated with a given subscriber of the telecommunications network. Each of the subscriber addresses may correspond to a respective subscriber terminal, such as subscriber terminal 302, 304, or 306. In FIG. 3, logical connections and out-of-band signaling pathways are represented by dashed lines and circuit-switched or packet-data connections for voice, data, and other content (i.e., "content connections") are represented by solid lines.

The telecommunications network 300 may be partial or full deployment of most any communication or computer network, and thus, can include a few or many network elements. Accordingly, the telecommunications network 300 can include elements of any public or private wireline, terrestrial wireless and/or satellite networks. Details of preferred public and private networks may be found in co-pending U.S. patent application Ser. No. 10/748,599, filed on Dec. 29, 2003, and entitled "Roaming-Agreement Application and Database for Roaming between Public and Private Wireless Networks," the entirety of which is fully incorporated herein by reference.

In practice, the telecommunications network 300 may include elements of (i) a Public Switched Telephone Network ("PSTN") 312 including the hardware and services provided by local exchange carriers (LECs) and interexchange carriers (IXCs); (ii) a public wireless network 314, such as a Sprint PCS network; and/or (iii) a private wireline and/or wireless network (collectively referred to as "private network") 316, which may be embodied as a Private Branch Exchange (PBX), a license-free, Industrial, Scientific and Medical (ISM) band wireless network, other band wireless network and the like. The private network 316 may include a private gateway 317 to connect to elements of the PSTN 312 and/or the public wireless network 314.

For simplicity, most of the elements of the PSTN 312, public wireless network 314, and private network 316 are not shown in FIG. 1. Instead, most of the elements of each of the networks are respectively illustrated by an instance of the well known cloud representation.

One or more known formats and protocols may be used for communicating over the telecommunication network 300, and in turn, the PSTN 312, public-wireless network 314, and the private network 316. For example, the formats and protocols for communications between the elements of the PSTN 312, the wireline portions of public wireless network 314, and/or the wireline portions of the private network 316 may be specified by the well known Advanced Intelligent Network (AIN)/Signaling System 7 (SS7), other plain old telephone service (POTS) protocols, Ethernet (IEEE 802.3) specification, IS-41, IS-771, and the like.

In the case of the wireless portion of a communication channel of the public wireless network 314, the formats and protocols may be according to commonly used public wireless interface formats. The commonly used public wireless interface formats may include advanced mobile phone service (AMPS), time division multiple access (TDMA), global system for mobile communications (GSM), and code division multiple access (CDMA), universal mobile telecommunications service ("UMTS"), Wide-band CDMA ("WCDMA"), CDMA2000, generic packet radio services ("GPRS"), etc.

The format of the wired or wireless interface in a private network 316 may be based on the Ethernet (IEEE 802.3) specification, the Telecommunications Industry Association (TIA/EIA) IS-94 Recommendation entitled "Mobile Station—Land Station Compatibility Specification for Analog Cellular Auxiliary Personal Communications Services" ("IS-94"), the Bluetooth specification, the IEEE 802.11 standards, and/or other wireless local area network specification, in addition to the formats and/or protocols of the public wireless and/or wireline networks.

Although the networks 312, 314, and 316 are shown separately, they alternatively may be the same network or interconnected by any number of intermediate networks. If the networks 312, 314 and 316 overlap, then the mutual or common elements of these networks can behave as one entity. Alternatively, the functions of the mutual or common elements may be distributed among various network elements of the networks 312, 314, and 316.

Also Included in the telecommunications network 300 is an SCP 318, which is communicatively coupled to the PSTN 312 and the public wireless network 314 via signaling pathways 320 and 322, respectively. The SCP 318 intermediates much of the signaling between the network elements. As shown, the signaling over the signaling pathways 320 and 322 may be carried out using AIN 0.2 and IS-771 signaling standards, respectively. However, this signaling may be carried out using other standard or proprietary signaling systems.

The SCP 318 is operable to receive requests for call-processing services, such as call termination and call origination services for voice calls, from elements of the PSTN 312 and public wireless network 314, such as service switching points ("SSPs") 324, 326 and mobile switching centers ("MSCs") 328, 330, respectively. To respond to these requests, the SCP 318 is operable to obtain appropriate control information and call processing logic for the SSPs 324, 326 and/or MSCs 328, 330 from service-logic database 332 via interface 334.

With respect to request for call termination of a voice calls to one of the subscriber addresses associated with the subscriber terminals 302, 304, or 306, the SCP 318 may employ a rules-based engine 336 to determine which one of the subscriber addresses (and, in turn, which one of the subscriber terminals 302, 304, or 306) the voice calls is to be routed to.

The rules-based engine 336 may configured to obtain appropriate control information and call processing logic for the SSPs 324, 326 and/or MSCs 328, 330 from service-logic database 332 via interface 334. This control information and call processing logic may include a number of rules to assist in making such determination. Each of the rules, in turn, includes criteria for selecting one of the subscriber addresses (i.e., the delivery address) as function of the call histories associated with the plurality by the subscriber addresses.

To facilitate such functionality, the SCP 318 typically employs a computing platform. This computing platform may include, for example, software or firmware operating on a processing system, such as a general purpose computing system, a specialized computing system, an open source, e.g., a Linux, computing system, a proprietary computing system, and the like. The processing system may be configured for distributed or concentrated processing, and may be arranged in a peer-to-peer format, a client-server format or some combination thereof. In addition to the interface 334 used for querying the service-logic database 332, the processing system also includes input and output interfaces (not shown) to receive and respond to service requests from SSPs 324, 326, MSCs 328, 330, and/or other network elements.

As shown, the service-logic database 332 resides on the SCP 318. As noted above, however, the service-logic database 332 may reside within other computers on the telecommunications network 300 (not shown), and thus, may be communicatively coupled to the SCP 318 using a proprietary or standardized communication protocol, such as IS-41 or IS-771.

The service-logic database 322, which may be embodied as an Oracle or Structured Query Language ("SQL") database and/or database management system, is operable to store and provide to the SCP 318 appropriate control information and call processing logic, e.g., routing instructions, in response to a query for such information. Also included in the service-logic database 332 (or in a database separate from the service-logic database 332, but accessible to the SCP 318) is a call-history record 338.

This call-history record 338 typically maintains the subscriber addresses associated with the given subscriber of the telecommunications network 300, or more aptly the given subscriber's terminals 302, 304, and 306, and the call histories associated with each of the subscriber addresses.

The call-history record 338 is typically populated with the subscriber addresses upon subscription to the dynamic-routing service. However, the call-history record 338 may be modified to include more or less subscriber addresses at just about any time.

Each of the call histories in the call-history record 338 may contain historical information that is indicative of when its respective subscriber address previously originated and/or terminated a voice call. A timestamp may be used to indicate the when the subscriber addresses originated or terminated a voice call.

The call-history record 32 may alternatively include an address of the SSP 324, SSP 326, MSC 328, MSC 330, or other network element to which the subscriber terminals 302, 304 and 306 used is originating or terminating a prior voice call. In the case of the public wireless network, the SCP 318 is operable to obtain such information by querying, via signaling pathways 322, 340, a home location register ("HLR") 342 associated with subscriber terminal 306.

As depicted in FIG. 1, the subscriber terminal 302 is a desktop telephone used as the given subscriber's home telephone. The subscriber terminal 302, however, may be embodied as any telephone, personal digital assistant, or other device that transmits or receives voice, data, or other content over a wireline interface. Although the subscriber terminal 302 may be any such device, the subscriber terminal 302 is hereinafter referred to as the "home telephone" for the sake of simplicity.

The home telephone 302 is operable to originate a voice call to and/or terminate a voice call from the PSTN 312 via subscriber loop 344 and the SSP 326. To originate and terminate the voice call, the telecommunications network 300 requires the home telephone 302 to have an identity that the SCP 318 can use to provide instructions to the SSPs 324, 326, MSCs 328, 330, and/or other network element for appropriately setting up, routing, and tearing down the voice call.

This identity is typically the subscriber address of the home telephone 302, which, as noted above, is stored in the call-history record 338. The subscriber address may be, for example, a home telephone number that is permanently or dynamically assigned to the home telephone 302 by a service provider of the PSTN 312 or the telecommunication network 300 as a whole. The subscriber address, however, might not be a telephone number, but rather, some other notation that can be used to identify the home telephone 302 to the SSP 326 and telecommunication network 300.

Voice calls exchanged between the SSP 326 and other elements of the PSTN 312 may be carried over content connection 346(a). The signaling between the SSP 326 and other elements of the PSTN 312 may be carried over the signaling pathway 346(b). As shown, the signaling uses the AIN 0.2 signaling standard. This signaling, however, may be deployed using other standard or proprietary signaling systems.

Like the connections between the SSP 326 and PSTN 312, voice calls between the SSP 324 and other elements of the PSTN 312 may be carried over content connection 348(a). The signaling between the SSP 324 and other elements of the PSTN 312 may be carried over signaling pathway 348(b). As shown, this signaling uses the AIN 0.2 signaling standard. However, the signaling may be deployed using other standard or proprietary signaling systems.

The SSP 324 connects the private network 316, and in turn, the subscriber terminal 304 to the PSTN 312. Voice calls and signaling routed between the private network 316 and the SSP 324 may be carried over subscriber loop 350(a).

Like subscriber loop 350(a), voice calls and signaling routed between the private network 316 and the subscriber terminal 304 are carried over a local subscriber loop 350(b). The local subscriber loop 302(b) may be deployed as a circuit-switched or packet-data PBX line, an Ethernet, a media gateway interface, a wireless interface and/or other wireline or wireless interface. Details of an exemplary local subscriber loop and communications that may be carried thereon may be found in co-pending U.S. patent application Ser. No. 10/161,497, filed on Jun. 3, 2002, and entitled "Method and System for Diverting Wireless Network Communications," the entirety of which is fully incorporated herein by reference.

The subscriber terminal 304 as depicted in FIG. 1 is a desktop extension of a PBX used as the given subscriber's work telephone. Since the private network 316 may be deployed with wireline and wireless network elements, the subscriber terminal 304 may be embodied as any wireline and/or wireless device, such as a wireline telephone, a circuit-switched or packet-data PBX extension; a tethered personal digital assistant; a wireless personal digital assistant; a cellular, cordless or PCS telephone; or other device that transmits or receives voice, data, or other media over a wireline or an air interface. For convenience, the subscriber terminal 304 is hereinafter referred to as the "work telephone" even though the subscriber terminal 304 may be embodied otherwise.

The work telephone 304 is operable to originate to and terminate voice calls from the PSTN 312 via subscriber loops 350(a), 350(b), private network 316 and SSP 324. To originate and terminate voice calls, the telecommunications network 300 requires the work telephone 304 to have an identity that the SCP 318 can use to provide instructions to the SSPs 324, 326, MSCs 328, 330, and/or other network element for appropriately setting up, routing, and tearing down communications. This identity is typically the subscriber address as associated with the work telephone 304, which, as noted above, is also stored in the call-history record 338.

The subscriber address may be, for example, a work telephone number extension that is permanently or dynamically assigned to the work telephone 304 by a PBX server, a media gateway, a service provider of the PSTN 312, a service provider of the telecommunication network 10 or some other entity on the telecommunications network. The subscriber address, however, might not be a telephone number, but rather some other notation (e.g., a packet data or internet protocol address) that the work telephone 304 can use to identify itself to the SSP 324 and telecommunication network 300.

In addition to the connections already noted, the PSTN 312 is connected to the public wireless network 314 via content connection 352(a) and signaling pathway 352(b). Voice calls between the PSTN 312 and public wireless network 314 traverse the content connection 352(a), and the signaling associated with such communications traverse the signaling pathway 352(b).

The MSCs 328, 330 connect to the public wireless network 314 via content connections 354(a), 356(a) and signaling pathways 354(b), 356(b), respectively. Connected between the MSCs 328, 330 and base transceiver stations ("BTSs") 358, 360 are base station controllers ("BSCs") (not shown). The BSCs may be physically separate from or co-located with the respective MSCs 328, 330 and BTSs 358, 360. Alternatively, BSCs may not be used, and in which case its functions are typically performed by the respective MSCs 328, 330 or other network, such as a packet-data serving node (not shown) commonly used for digital communications. The BSCs typically manage the power levels and frequencies transmitted by the BTSs under its control, e.g., BTSs 358, 360, and may also control handoffs between BTSs.

Each of the BTSs 358, 360 may be provided with one or more antennas to define a wireless coverage area, which is termed a "cell." The BTSs 358, 360 may use directional antennas to define a plurality of "sectors" within each cell. In addition, the BTSs 358, 360 also typically perform radio resource management tasks for its given wireless coverage area. Within this wireless coverage area, the subscriber terminal 306 is able to communicate with either the BTS 358 or BTS 358, 360 over an air interface.

As depicted in FIG. 1, the subscriber terminal 306 is a mobile station, and thus, for simplicity, is referred to hereinafter as mobile station 306. This mobile station 306 may be a cordless, cellular or PCS telephone, a wireless personal digital assistant, or other device that transmits or receives voice, data, or other media over the air interface. For illustrative purposes only, the mobile station 306 is depicted (i) as a mobile station that is operating in its home network when communicating with the MSC 328 via the BTS 358, and (ii) as a mobile station that is roaming in a foreign network when communicating with the MSC 330 via the BTS 360.

Voice calls originated from or terminated to the mobile station 306 and received at the MSCs 328, 330 traverse respective content connections 354(a), 356(a) between the MSCs 328, 330 and the public wireless network 314. The signaling associated with such communications traverse respective signaling pathways 354(b), 356(b).

The MSCs 328, 330 are typically responsible for switching calls. For example, MSC 328 may switch calls between the BSCs to which it is connected, the PSTN 312, and other MSCs (not shown) in public wireless network 314. Typically, the MSCs 328, 330 perform the signaling needed to originate and terminate calls to the mobile station 306 when operating in the respective coverage areas of public wireless network 314. To allow the signaling needed to route calls through PSTN 312 and to communicate with other elements of public wireless network 314, the MSCs 328, 330 may be connected to one or more STPs (not shown), which in turn, are connected to the SCP 318.

In addition to the HLR 342, the public wireless network 314 typically includes a Visitor Location Register (VLR) (not shown) for each of the MSCs 328, 330. Each of the VLRs keep track of the subscriber terminals, such as mobile station 306, that are operating in, or have recently operated in, the areas controlled by the MSCs 328, 330. The VLRs are preferably attached to, or a part of, the MSCs 328, 330, but may be remotely located. In such case, the MSCs 328, 330 may communicate with the VLRs using a proprietary or standardized signaling system, such as IS-41 or IS-771.

The HLR 342 stores information for the mobile station 306 and other mobile stations that subscribe to a home portion of the public wireless network 314 (hereinafter "home coverage area"). In particular, the HLR 342 maintains an HLR-data record for the mobile station 306. The HLR-data record may include a service profile along with status information. The data records in HLR 342 may be indexed by a MIN, MDN, MSID, MEID, ESN or other identifier of the mobile station 306. The service profile typically contains a list of the services the mobile station 306 subscribes to in public wireless network 314. The service profile may also include one or more triggers, such as WIN triggers, to provide enhanced telecommunications services, such as the dynamic-routing service.

The status information typically specifies whether the mobile station 306 is active, i.e., is registered with a known wireless network, or inactive, i.e., not currently registered with any known wireless network. If the mobile station 306 is active, the status information also typically includes a locator address that identifies the network element that last reported the location of the mobile station 306. In IS-41, the locator address is typically the point code of the MSCs 328, 330 or the VLRs associated therewith. The locator address tells network how to route calls or other information to the mobile station 306. Thus, HLR 342 serves as a centralized repository of key information about the mobile station 306.

Typically, the HLR 342 is physically separate from its other elements in its home coverage area, such as MSC 328. In such case, the MSC 328 communicates with HLR 342 by using a signaling system, such as IS-41, and the signals are typically routed through one or more signal transfer points (STPs) (not shown). MSCs outside of the home coverage area, such as MSC 330, are also able to communicate with the HLR 342, and thus, are able to obtain information about the mobile station 306 when roaming, i.e., when operating in the coverage area of MSC 330. Like the MSC 328, the MSC 330 may communicate with HLR 342 via one or more STPs using a signaling system, such as IS-41.

When the mobile station 306 registers with public wireless network 314 via MSC 328, the MSC 328 downloads its service profile from the HLR 342 into its VLR. Similarly, when the mobile station 306 registers with public wireless network 314 via MSC 330, the MSC 330 downloads its service profile from the HLR 342 into its VLR. Once a service profile is loaded into the appropriate VLR, the MSC associated with the VLR may refer to it to determine how to process calls involving the mobile station 306. Periodically, the service profile and status information maintained in the VLR and the HLR 342 is updated or refreshed so as to maintain consistency between the service profile and status information in the separate entities.

As described in more detail below, when MSCs 328, 330 detect a trigger during call processing, which indicates that enhanced telecommunications services, such as the dynamic-routing service, may be implicated, the MSCs 328, 330 send a query message to SCP 318. Responsive the query, the SCP 318 returns call processing instructions (as noted above) needed to provide the enhanced telecommunications service, e.g., routing voice calls.

The SCP 318 is typically provided with one or more interfaces to allow control over and provisioning of SCP 318. The service interface, in turn, may include a service creation environment ("SCE") to allow service logic to be created, tested, and downloaded to SCP 318. The service interface may also allow information to be retrieved from SCP 318 so as to verify the service logic and generate reports.

Registration and De-Registration

Unlike a wireline telephone, such as the home telephone 302, the mobile station 306 has to register with the public wireless network 314 before it is able to place or receive calls. Thus, with reference to FIG. 3, the mobile station 306 must register with public wireless network 314 before it is able to use the resources of the public wireless network 314. Typically, the mobile station 306 will attempt to register with the public wireless network when it powers up in the wireless coverage area of the public wireless network 314.

The mobile station 306 may also become registered with the public wireless network 314 as a result of a handoff to the network. Alternatively, the mobile station 306 may be programmed to attempt to re-register with the public wireless network 314 periodically, such as every 10 minutes.

Details on carrying out an exemplary registration of the mobile station 306 are provided in Michael D. Gallagher and Randall A. Snyder, "Mobile Telecommunications Networking with IS-41" (McGraw-Hill 1997). Further details for carrying out a registration in both public and private wireless networks are provided by commonly-assigned, co-pending U.S. application Ser. No. 10/161,313, filed on Jun. 3, 2002, and entitled "Method and System for Intersystem Wireless Communications Session Hand-Off," which is fully incorporated herein by reference. Additional details may be found in commonly-assigned, co-pending U.S. patent application Ser. No. 10/161,497, filed on Jun. 3, 2002, entitled "Method and System for Diverting Wireless Network Communications," as noted above.

Figure 4:
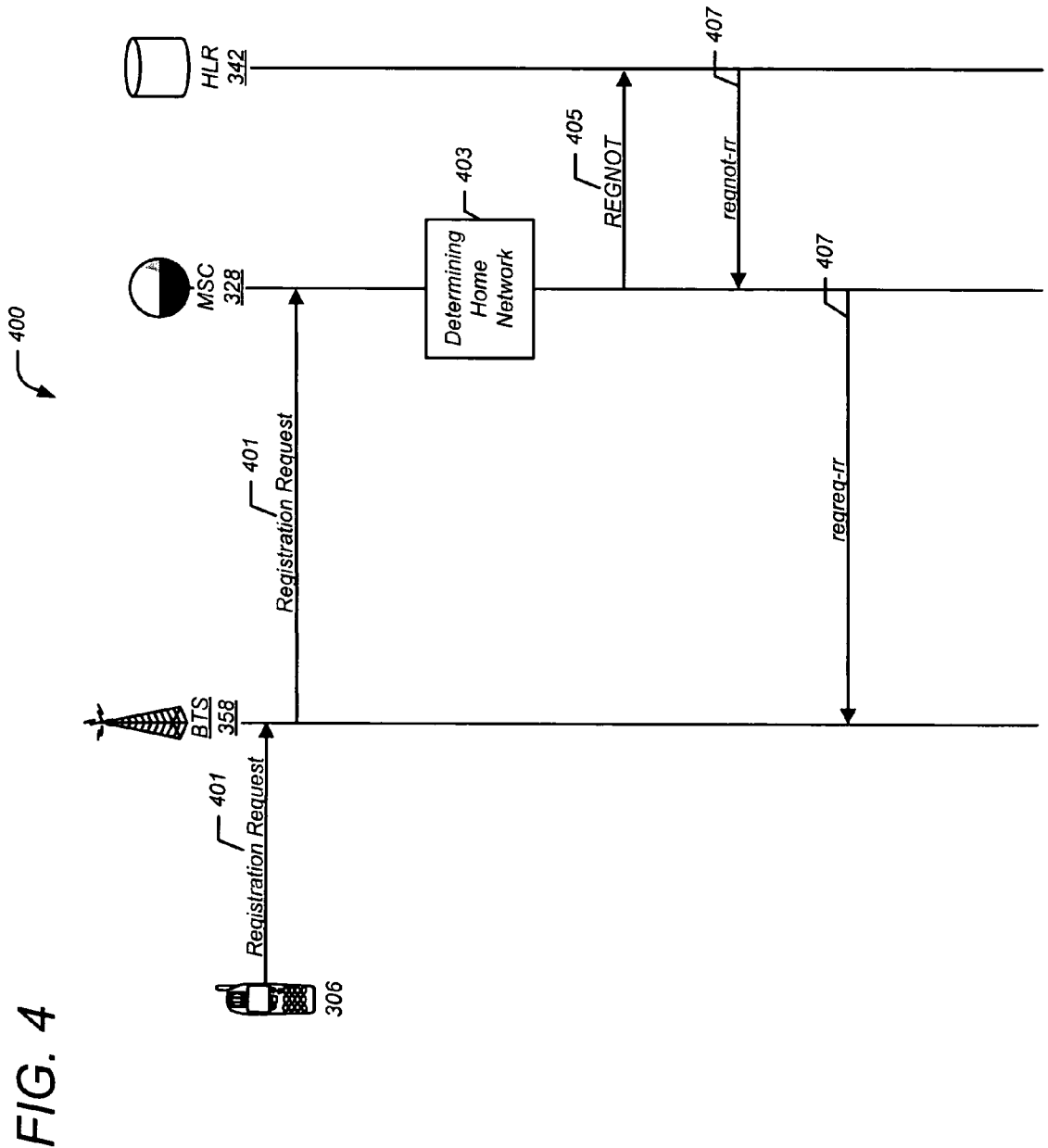
FIG. 4 is a first call-flow diagram illustrating a call flow for carrying out signaling that may occur when a mobile station attempts to register with public wireless network.

FIG. 4 is a simplified call-flow diagram illustrating a call flow 400 for carrying out signaling that may occur when a mobile station, such as mobile station 306, attempts to register with public wireless network 314. The call flow described herein with respect to FIG. 4 and subsequent figures are described based on the use of IS-41 and IS-771. However, it is to be understood that other signaling systems or protocols could also be used. Moreover, the following describes when the mobile station 306 attempts to register with public wireless network 314 via MSC 328. One skilled in the art will recognize that a registration attempt via MSC 330 is essentially the same as described below.

The registration attempt begins when the mobile station 306 transmits a registration request message 401. Registration request message 401 signifies that the mobile station 306 is attempting to register, and typically includes as registration request information the MIN, MDN, MSID, MEID, ESN or other identifier of the mobile station 306 along with other IS-41 parameters. The BTS 358 receives the registration request message 401 and relays it to the BSC (not shown). The BSC then relays the registration request message 401 to the MSC 328.

Using the MIN, MDN, MSID, MEID, ESN or other identifier of the mobile station 306, the MSC 328 determines the elements of the public wireless network 314 that encompass the home coverage area of the mobile station 306, as shown in call flow element 403. The MSC 328 uses this information to locate the HLR 342.

Once located, the MSC 328 may then transmit to the HLR 342 a registration notification ("REGNOT") message 405. The REGNOT message 405, in addition to carrying the MIN, MDN, MSID, MEID, ESN or other identifier of the mobile station 306, may also include a number of other parameters to control communications in the home portion of the public wireless network 314 once it is registered. For example, when reporting the registration attempt of the mobile station 306, the REGNOT message 405 typically includes parameters that identify the MSC 328. These parameters may include a mobile switching center identifier ("MSCID") associated with the MSC 328, and a system identifier (e.g., SYSID) and a network identifier (e.g., NETID) of the home portion of the public wireless network 314.

After receipt of the REGNOT message 402, the HLR 342 uses the identifying information to try to locate the HLR-data record for the mobile station 306. Sometime after the HLR 342 finds the HLR-data record, it transmits it or some portion thereof, to the MSC 328 in, for example, a registration notification return result ("regnot_rr") message 407. The MSC 328, in turn, sends a registration request return result (regreq_rr) message 407 to the BSC (not shown), and thereafter to the BTS 358 to allow access to the public wireless network 314. As noted above, when the mobile station 306 is registered with the public wireless network 314, the HLR 342 has a locator address for it that identifies which MSC, e.g., MSC 328 or MSC 330, is serving it.

Figure 5:
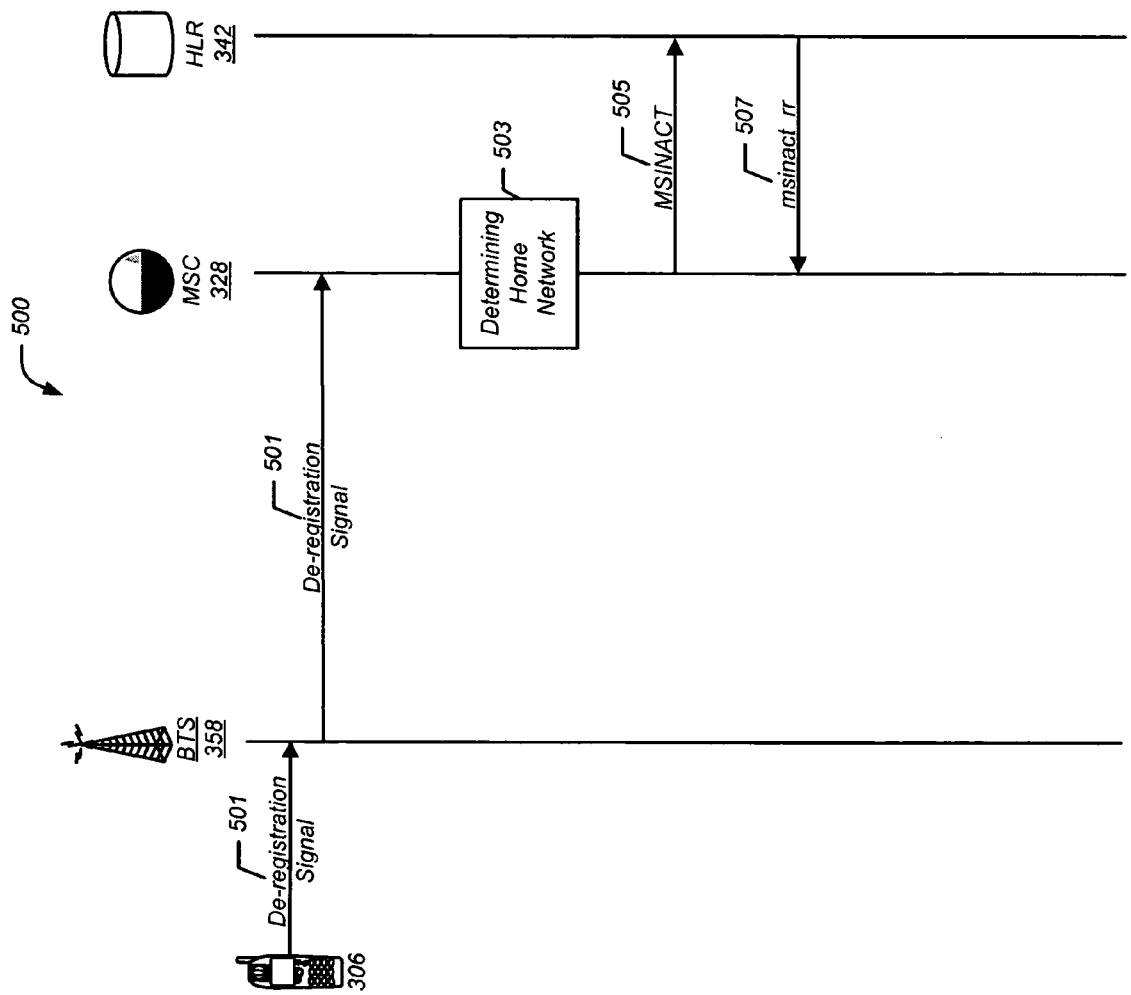
FIG. 5 is a second call-flow diagram illustrating a call flow for carrying out signaling for de-registering a mobile station from the public wireless network.

FIG. 5 is a simplified call-flow diagram illustrating a call flow 500 for carrying out signaling for de-registering a mobile station, such a mobile station 306, from the public wireless network 314. The de-registering may occur when the mobile station 306 powers off within or is outside the wireless coverage of public wireless network 314. The following describes when the mobile station 306 de-registers with the public wireless network 314 via MSC 328. One skilled in the art will recognize that the de-registration attempt via MSC 330 is essentially the same as described below.

The mobile station 306 sends a de-registration signal 501, which is received by the BTS 358 and forwarded to the MSC 328 via the BSC. The signal 501 may include the MIN, MDN, MSID, MEID, ESN or other identifier of the mobile station 306. Using the MIN, MDN, MSID, MEID, ESN or other identifier of the mobile station 306, the MSC 328 may determine the elements of the home coverage area for the mobile station 306, as shown in call flow element 503. The MSC 328 uses this information to locate the HLR 342.

The MSC 328 then sends an IS-41 mobile station inactive ("MSINACT") message 505 to the HLR 342 to indicate that the mobile station 306 is inactive and not able to receive calls. The MSINACT message 305 normally includes the MIN, MDN, MSID, MEID, ESN or other identifier of the mobile station 306, which the HLR 342 may use for updating its status information.

The HLR 342 confirms receipt of the MSINACT message 505 by sending to the MSC 328 an IS-41 msinact_rr message 507. The MSC 328 then deletes the entry for the mobile station 306 from its VLR. Although the VLR entry is deleted, upon de-registering with the public wireless network 314, the HLR 342 continues to maintain a locator address that identifies which MSC last served the mobile station 306, e.g., MSC 328 or MSC 330.

Like the mobile station 306, the work telephone 304 when embodied as a wireless device has to register with the private network 316 to originate and receive communications. Registering the private network 316, in the simplest form, may include merely "associating" the work telephone 304 with the private network 316 via private gateway 317. Additionally, registration also may include "logging" into the private gateway 317.

Figure 6:
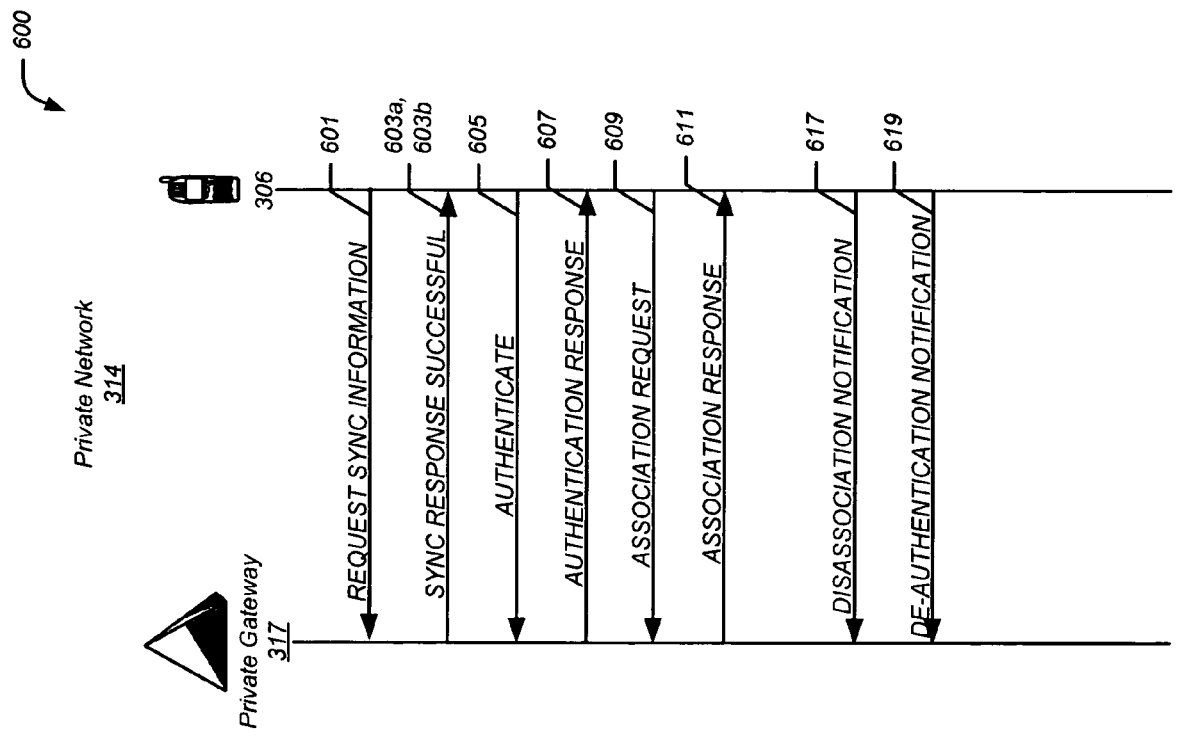
FIG. 6 is a third call-flow diagram illustrating a call flow for registering a wireless network device with a private network.

While similar to other wireless formats, registering with the private network 316 may involve a different process than registering with the public wireless network 314, as described above. The process of registration of the work telephone 304 may be illustrated with reference to FIG. 6. FIG. 6 is a simplified call-flow diagram illustrating a call flow 600 for registering the work telephone 304 with the private network 316.

The registration may occur after the work telephone 304 (i) powers up, (ii) exits from sleep mode, (ii) enters the coverage area of the private network 316, or (iv) otherwise notifies the private network 316 of its presence. The communication flows described herein with respect to FIG. 6 are described with reference to FIG. 3, and based on the private network 316 complying with the IEEE 802.11 standard. It is to be understood that other private network 316 protocols may also be used.

First, the work telephone 304 senses the wireless medium, and if the medium is free, i.e. no other station is currently transmitting, then the work telephone 304 transmits a request for synchronization information 601 from the private gateway 317. On the other hand, if the wireless medium is busy, the work telephone 304 delays transmission for a period of time before re-requesting the synchronization information. Alternatively, the work telephone 304 may request the synchronization information from another wireless subscriber terminal when the private network 316 is operates in an ad-hoc mode.

The work telephone 304 may receive the synchronization information by passive scanning 603a, i.e. the work telephone 304 receives a beacon-frame containing the synchronization information from the private gateway 317. Alternatively, the work telephone 304 may receive the synchronization information from the private gateway 317 by using an active scanning schema 603b. The active scanning schema may be accomplished by transmitting probe-request frames, and then waiting for a probe-response frame from the private gateway 317.

Second, after the work telephone 304 is synchronized with the private gateway 317, the work telephone 304 "authenticates" with the private network 316. To authenticate, the work telephone 304 exchanges frames, or packet-data, with the private gateway 317. The exchange eventually results in the mutual verification of identity of each other. When the work telephone 304 attempts to authenticate with the private gateway 317, the work telephone 304 sends an authentication request 605.

In response and upon proper identity verification, the private gateway 317 sends the work telephone 304 an authentication response 607 containing an indication of whether the association is successful or unsuccessful. Third, once the work telephone 304 mutually authenticates with the private gateway 317, the work telephone 304 then associates with the private network 316. If, however, either the work telephone 304 or the private gateway 317 do not mutually authenticate, then the private gateway 317 de-authenticates or otherwise denies access to private network 316. The private gateway 317 will invoke de-authentication when the work telephone 304 presents incorrect credentials or authentication settings; fails applied IP and medium access control (MAC) layer filters; or otherwise supplies invalid identification information.

In the process of associating, the work telephone 304 exchanges information with the private gateway 317 to which the work telephone 304 is also authenticated. As part of the association process, the work telephone 304 sends an association request 609. The association request 609 includes sending the IEEE 802.11 or some other format packet-data (802.11/packet-data) address of the work telephone 304. The association request also includes the 802.11/packet-data address of the private gateway 317.

In response to the association request, the private gateway 317 sends to the work telephone 304 an association response 611. The association response 611 contains either a "successful" or an "unsuccessful" result. Upon "successful" association, the response includes an association identifier that notifies the work telephone 304 that the private network 316 has voice, data or other media content ready to send to it, if any.

Once associated, the work telephone 304 is capable of transmitting and receiving voice calls. Ideally, the capability of transmitting and receiving communications extends beyond the work telephone 304 to the other wireless and fixed-access communication devices associated with the work telephone 304, if so enabled.

After registering, the private gateway 317 may send a signaling message to the SSP 324 to indicate that the work telephone 304 is active in the private network 316 and voice calls may be directed to the work telephone 304. This signaling may be carried out in a variety of ways. For example, the private gateway 317 may simply send a signaling message to the SCP 318 notifying that the work telephone 304 is active.

The private gateway 317 may send the signaling message using SS7, IS-41, IS-771, Session Initiation Protocol (SIP), or other standard or protocol. As part of the signaling message, the private gateway 317 sends the subscriber address of the work telephone 304.

FIG. 6 also shows the work telephone 304 de-registering with the private network 316. The association between the private gateway 317 and the work telephone 304 may be terminated by either de-authentication or by disassociation. To disassociate, either the private gateway 317 or work telephone 304 transmits a disassociation notification message 617. Typically included in the disassociation notification message 617 is (i) the 802.11/packet-data address of the work telephone 304, and (ii) the 802.11/packet-data address of the private gateway 317. Upon receipt of the disassociation notification message 617, the private gateway 317 disassociates, with no response sent to the work telephone 304.

To de-authenticate, the private gateway 317 or work telephone 304 transmits a de-authentication notification message 619. The de-authentication notification message 619 is transmitted to the private gateway 317. Like the disassociation message 617, the de-authentication message 619 typically includes (i) the 802.11/packet-data address of the work telephone 304, and (ii) the 802.11/packet-data address of the private gateway 317. Upon receipt of the de-authentication message 619, the private gateway 317 and work telephone 304 de-authenticate, and like disassociation, no response is sent to the work telephone 304.

After de-authentication, partial disassociation, or complete disassociation, the work telephone 304 may no longer exchange communications with the private network 316. Further, upon de-authentication, partial disassociation, or complete disassociation, the private gateway 317 may signal the SSP 324 or other network entity to notify that the work telephone 304 is no longer active in the private wireless network.

Establishing Call-History Information

Figure 7:
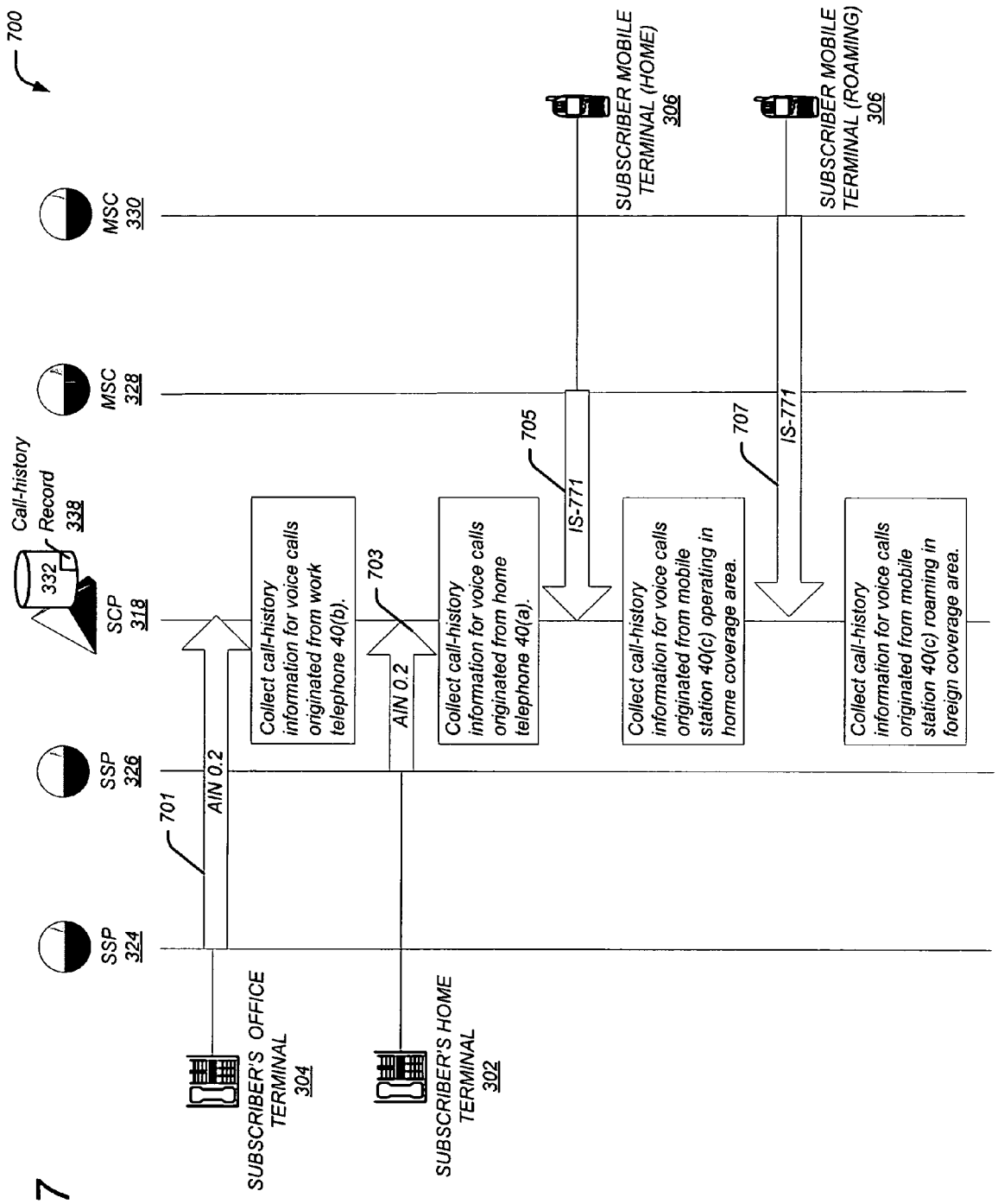
FIG. 7 is a fourth call-flow diagram illustrating a call flow for collecting call-history information relating to calls originated from a plurality of subscriber terminals.
Figure 8:
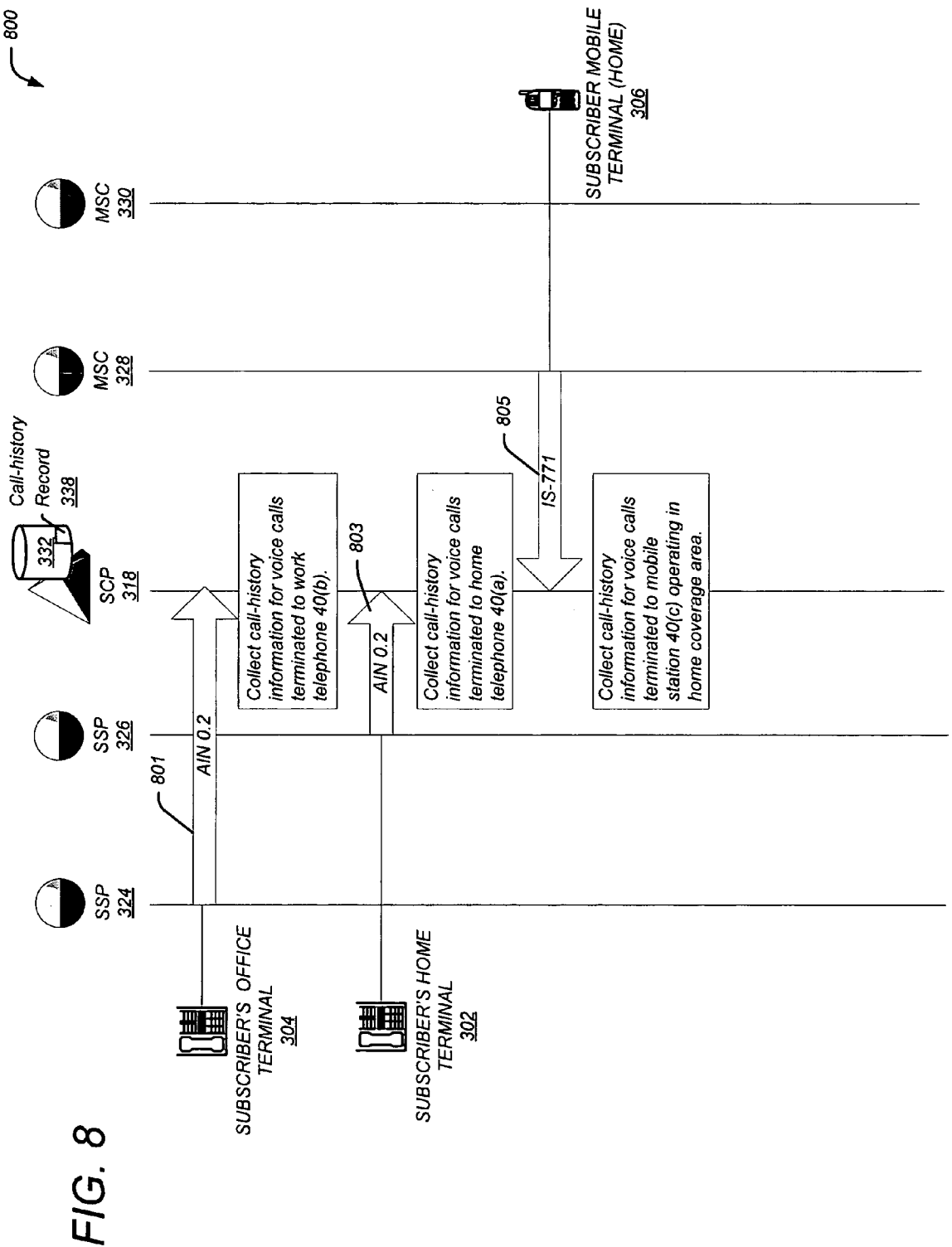
FIG. 8 is a fifth call-flow diagram illustrating a call flow for collecting call-history information relating to calls terminated to a plurality of subscriber terminals.

FIGS. 7 and 8 are call-flow diagrams illustrating respective call flows 700 and 800 for collecting call-history information for the plurality of subscriber addresses that are associated with the given subscriber of the telecommunications network. Each of the subscriber addresses may correspond to a respective subscriber terminal, such as subscriber terminal 302, 304, or 306.

As shown in call flow 700, the SCP 318 stores in the call-history record 338 call-history information collected by the SCP 318 during voice call origination by any of the home telephone 302, work telephone 304, and mobile station 306. In call flow 800, the SCP 318 stores in the call-history record 338 call-history information collected by the SCP 318 during voice call termination to any of the home telephone 302, work telephone 304, and mobile station 306.

Referring now to FIG. 7 at call flow elements 701, 703 the work telephone 304 and the home telephone 302 make respective independent attempts to originate voice calls towards called party terminals (not shown). Responsive to the origination attempts, respective origination sequences are carried out.

The origination sequence for the work telephone 304 may be carried out between the SSP 324 and the SCP 318, whereas the origination sequence for the home telephone 302 may be carried out between the SSP 326 and the SCP 318. As illustrated, these origination sequences may be carried out according the AIN 0.2 signaling standard, although other signaling systems may be used.

During the origination sequence for the work telephone 304, the SCP 318 detects a trigger in the call-processing logic retrieved from the service-logic database 332. This trigger is used to invoke a collection process for storing call-history information. The collection process entails storing (and associating with the subscriber address of the work telephone 304) when, i.e., the time at which, the work telephone 304 makes the origination attempt. Responsive to the trigger, the SCP 318 invokes the collection process, and stores in the call-history data record 338 the time at which the work telephone 304 makes the origination attempt.

Similarly, during the origination sequence for the home telephone 302, the SCP 318 detects a trigger for invoking the collection process in the call-processing logic retrieved for the service-logic database 338. In this case, the collection process entails storing (and associating with the subscriber address of the home telephone 302) when the home telephone 302 makes the origination attempt. Responsive to this trigger, the SCP 318 invokes the collection process, and stores in the call-history data record 338 the time at which the home telephone 302 makes the origination attempt.

In either case, the SCP 318 may store, as an alternative, the time at which the origination attempt fails, the time that the voice call ends, or any other time in between. The times may be stored as a timestamp or other notation indicative of time.

Referring now to call flow element 705, 707, the mobile station 306 attempts to originate a voice call towards a called-party terminal (not shown). For call flow element 705, the mobile station 306 attempts to originate a voice call via the MSC 328 (i.e., when in its home coverage area of the public wireless network 314). For call flow element 707, the mobile station 306 attempts to originate a voice call via the MSC 330 (i.e., when roaming in a foreign coverage area of the public wireless network 314). Responsive to these origination attempts, respective origination sequences are carried out.

The origination sequence for the mobile station 306 when operating in the home portion of the public wireless network 314 may be carried out between the MSC 328 and the SCP 318, whereas the origination sequence for the roaming mobile station 306 may be carried out between the MSC 330 and the SCP 318. As illustrated, these origination sequences may be carried out according the IS-771 signaling standard, although other signaling systems may be used.

During either of origination sequences for the mobile station 306, the SCP 318 detects a trigger for invoking the collection process in the call-processing logic retrieved for the service-logic database. In this case, the collection process entails storing (and associating with the subscriber address of the mobile station 306) when the mobile station 306 makes the origination attempt. For convenience, the collection process may also include storing (and associating with the subscriber address of the mobile station 306) the address of the appropriate MSC, e.g., MSC 328 or MSC 330.

Responsive to the trigger, the SCP 318 invokes the collection process, and stores in the call-history data record 338 the time at which the mobile station 306 makes the origination attempt. The address of the appropriate MSC, e.g., MSC 328, or MSC 330, may also be stored in the call-history data record 32. However, because the address of the appropriate MSC is stored in the HLR 342 and available to the SCP 318 when processing the control information and service logic for the dynamic-routing service, such information need not be stored in the call-history data record 32.

Referring now to FIG. 8 at call flow elements 801, 803, the work telephone 304 and the home telephone 302 make respective independent attempts to terminate a voice call from a calling party terminal (not shown). Responsive to a successful termination of a voice call to the work telephone 304 or the home telephone 302, respective termination sequences are carried out.

In call flow element 805, the mobile station 306 makes attempts to terminate a voice call from a calling party terminal (not shown) via the MSC 328. Responsive to a successful termination to the mobile station 306, a respective termination sequence is carried out.

The termination sequences of call flow elements 801-805 are similar to the origination sequences, except that the home telephone 302, work telephone 304 and mobile station 306 are undergoing a termination sequence rather than an origination sequence. One skilled in the art will recognize and appropriately adjust for the dissimilarities between termination and origination sequences so as to determine the times that are to be stored in the call-history data record 32 with respect to the home telephone 302, the work telephone 304 and the mobile station 306.

Figure 9:
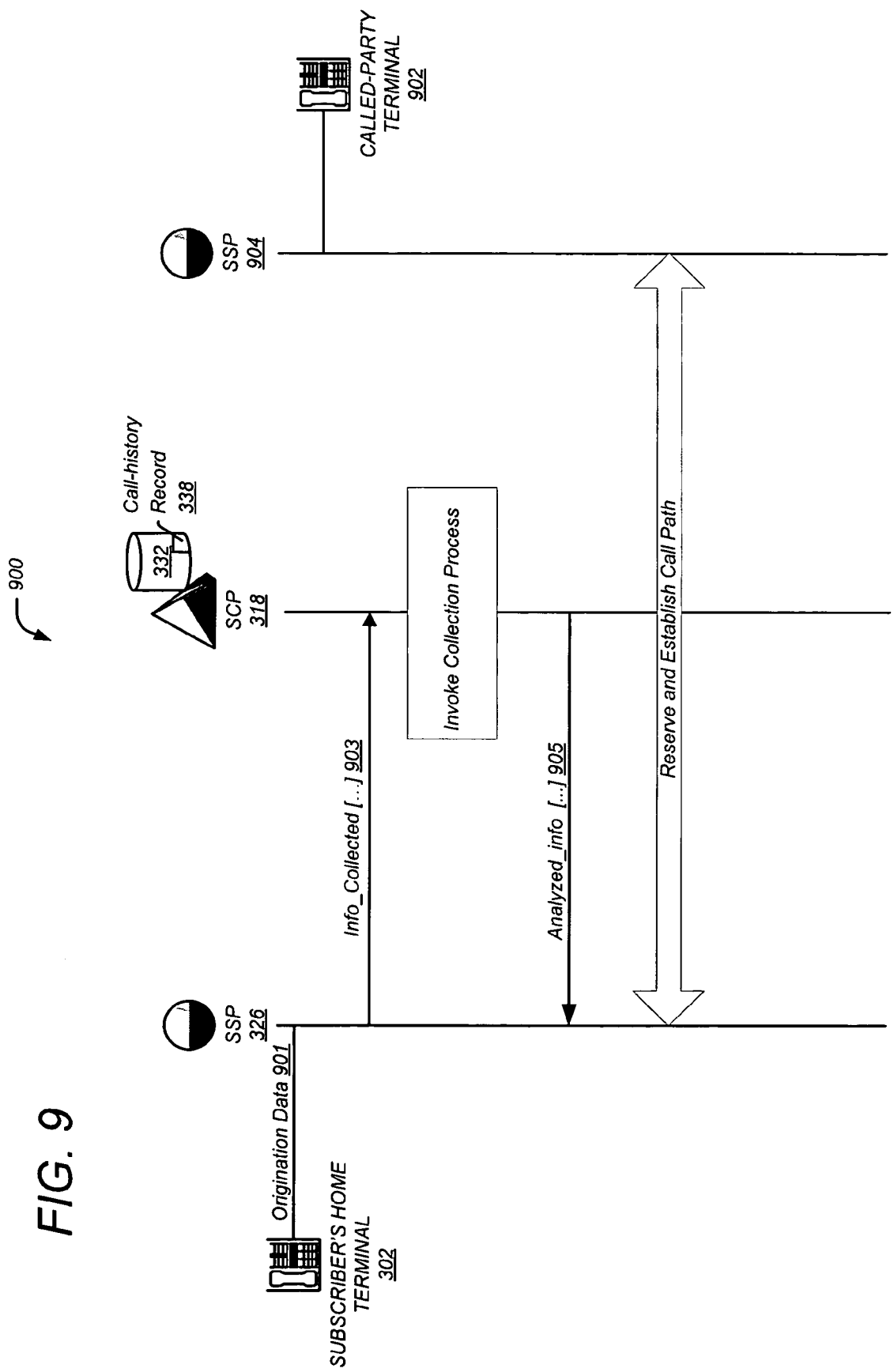
FIG. 9 is a sixth call-flow diagram illustrating an exemplary call flow for invoking call-history collection when a subscriber terminal originates a voice call in a wireline network.

As one skilled in the art will recognize, the origination and termination sequences may be carried out in a number of ways. The following describes several exemplary origination and termination sequences for collecting the call-history information Call Origination FIG. 9 is a simplified call flow diagram illustrating an exemplary call flow 900 for invoking call-history collection when the home telephone 302 originates a voice call in a wireline network. As one skilled in the art will recognize, the call flow 900 may equally illustrate an exemplary for invoking call-history collection when the work telephone 304 originates a voice call in a wireline network.

To start, a user of the home telephone 302 enters a number of digits representative of a called-party terminal 902 into the home telephone 302. The home telephone 302 then transmits to the SSP 326 one or more signals 901 containing origination data (e.g., the dialed digits).

In response to receiving the signals 901, the SSP 326 may place the origination data into an AIN 0.2 TCAP information-collected ("Info_Collected") message 903, and send it to SCP 318. Responsive the Info_Collected message 903, the SCP 318 interrogates the call-processing logic stored in the service-logic database 338. The service-logic database 338 returns a trigger to invoke the collection process and an address for accessing the call-history data record 338. The SCP 318, in response to the trigger and address, invokes the collection process.

Responsive to the Info_Collected message 903, the SCP 318 sends a TCAP Analyzed_info message 907 to the SSP 326. After receiving the Analyzed_info message 907, the SSP 326 reserves a network path between the SSP 326 and the called-party terminal 902 via destination SSP 904 using known TCAP or other signaling methods in the art.

During the collection process, the SCP 318 invokes the collection service, which is operable to continuously or periodically store in the call-history data record 338 a timestamp indicative of when (i) the origination attempt is initiated, (ii) the origination attempt fails, (iii) the time the voice call ends, if so completed, and/or (iv) any time in between. Since the SSP 326 is in the voice call path, the call-history information may be collected and stored in the call-history data record 338 in real time. After the home telephone 302 or the called-party terminal 902 disconnects, the voice call is torn down using well known methods. Once torn down, the collection service typically stops collecting call-history information.

Figure 10:
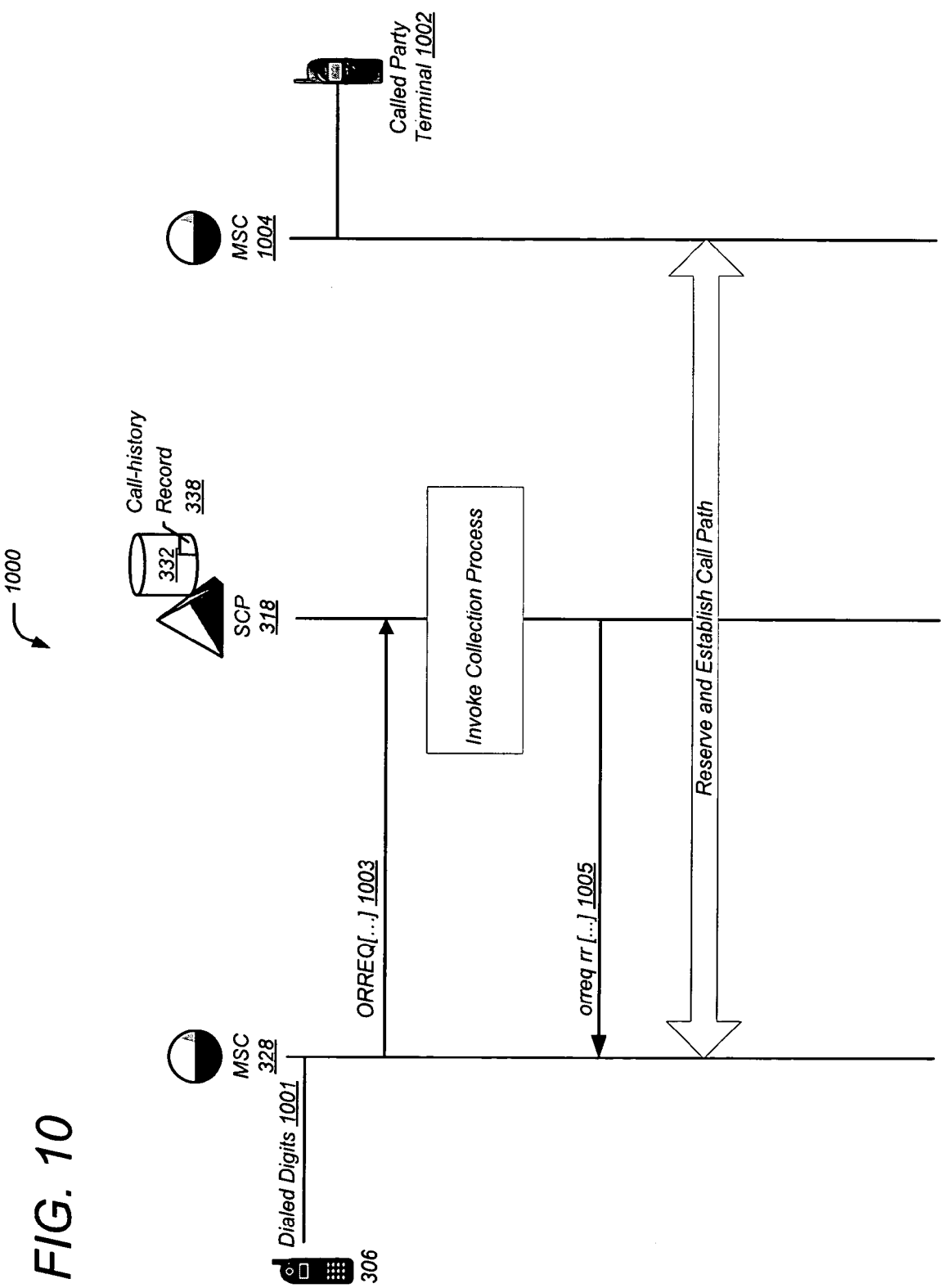
FIG. 10 is a seventh call-flow diagram illustrating an exemplary call flow for invoking call-history collection when a voice call is terminated to a subscriber terminal in a wireline network

FIG. 10 is a simplified call flow diagram illustrating an exemplary call flow 1000 for invoking call-history collection when the subscriber mobile station 306, which is already registered with public wireless network 314 and operating in its home coverage area, originates a voice call. As one skilled in the art will recognize, the call flow 1000 may equally illustrate an exemplary for invoking call-history collection when the subscriber mobile station 306, which is already registered with public wireless network 314 and roaming in the foreign portion thereof, originates a voice call.

To start, a user of the mobile station 306 enters a number of digits representative of a called-party terminal 1102 into the mobile station 306. The mobile station 306 transmits a signal 1001 containing the dialed digits. While not shown, the BTS 358 receives the dialed digits and forwards them to the MSC 328.

In response to receiving the signal 1001, the MSC 328 may parse the dialed digits from the signal 1001 and place them into an IS-41 or IS-771 Origination Request ("OR-REQ") message 1003. In addition to the dialed digits, the ORREQ message 1003 may include the MIN, MDN, MSID, MEID, ESN or other identifier of the mobile station 306. The MSC 328 may then send the ORREQ message 1003 to the SCP 318.

Responsive the ORREQ message 1003, the SCP 318 interrogates the call-processing logic stored in the service-logic database 338. Responsive to the interrogation, the service-logic database 338 provides a trigger to invoke the collection process and an address for accessing the call-history data record 338. The SCP 318, in response to the trigger and address, invokes the collection process. Responsive to the ORREQ message 1003, the SCP 318 sends an IS-41 Origination Request Return Result ("orreq_rr") message 1005 to the MSC 328. After receiving the orreq_rr message 1005, the MSC 328 reserves a network path between the MSC 328 and the called-party terminal 1002 via destination MSC 1004 using any know method in the art.

During the collection process, the SCP 318 invokes the collection service, which is operable to continuously or periodically store in the call-history data record 338 a timestamp indicative of when (i) the origination attempt is initiated, (ii) the origination attempt fails, (iii) the time the voice call ends, if so completed, and/or (iv) any time in between. Since the MSC 328 is in the voice call path, the call-history information may be collected and stored in the call-history data record 338 in real time.

After the mobile station 306 or the called-party terminal 1002 disconnects, the voice call is torn down using well known methods. Once torn down, the collection service typically stops collecting call-history information.

Call Termination

Figure 11:
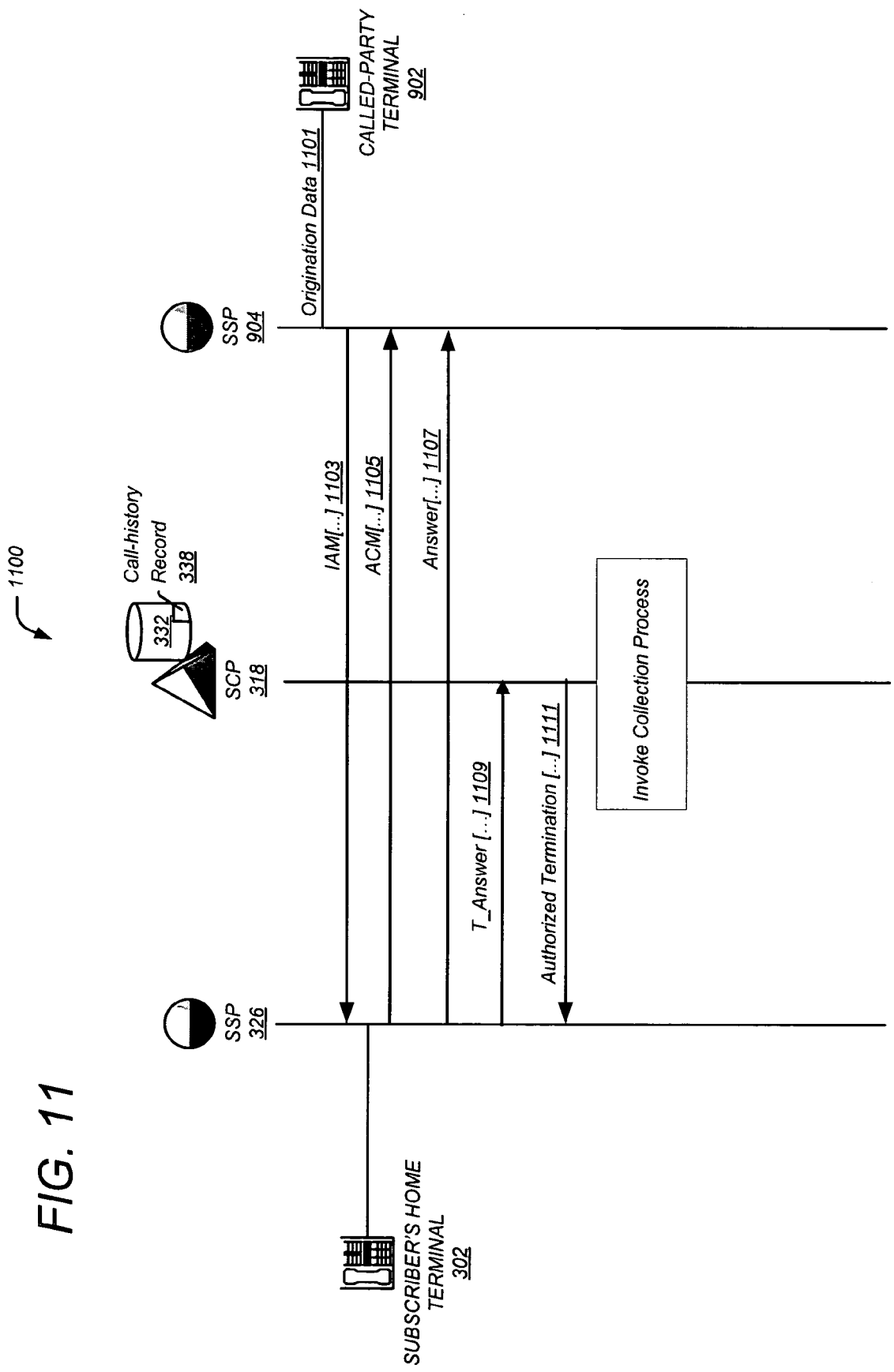
FIG. 11 is an eighth call-flow diagram illustrating an exemplary call flow for invoking call-history collection when a subscriber mobile station terminates a voice call.

FIG. 11 is a simplified call flow diagram illustrating an exemplary call flow 1100 for invoking call-history collection when a voice call is terminated to the home telephone 302. As one skilled in the art will recognize, the call flow 1100 may equally illustrate an exemplary for invoking call-history collection when a voice call is terminated to the work telephone 304.

To start, a user of a called-party terminal 902 enters into the called-party terminal 902 a number of digits representative of the subscriber address associated with the home telephone 302. The called-party terminal 902 transmits to the SCP 904 a signal 1101 containing the origination data to the destination SSP 904.

In response to receiving the signal 1101, the SSP 904 may parse the origination data from the signal 1101 and place it into an ISUP LAM 1103 to reserve a network path between itself and the SSP 326. The destination SSP 904 may then transmit the LAM 1103 to the SSP 326. In turn, the SSP 326 may then transmit (I) a signal set to ring the home telephone 302, and (ii) transmit to the destination SSP 904 an ISUP ACM message 1105 acknowledging that a network path is reserved.

Once the called party answers the page by going "off-hook," the SSP 326 sends an ISUP Answer message 1107 to the destination SSP 904. Upon processing of the Answer Message 1107, the call set-up is complete between the home telephone 302 and called-party terminal 902. Once complete, voice content can be exchanged.

In addition to ISUP Answer message 1107, the SSP 326 may transmit to the SCP 318 a termination-answer ("T_Answer") message 1109 to notify the SCP 318 that the home telephone 302 has answered a call. In response to the T_Answer message 1109, the SCP 318 invokes the collection process. The collection process is then operable to continuously or periodically store in the call-history data record 332 a timestamp indicative of the time at which (i) the termination attempt is initiated, (ii) the termination attempt fails, (iii) the time the termination successfully completes, (v) the time the voice call ends, and/or (v) any time in between. Like above, the call-history information may be collected and stored in the call-history data record 338 in real time because the destination SSP 326 is in the voice call path.

In addition to invoking the collection process, the SCP 318 returns an authorized-termination message 1111 to the destination SSP 326. After the home telephone 302 or the called-party terminal 902 disconnects, the voice call is torn down using well known methods. Once torn down, the collection service typically stops collecting call-history information. To facilitate such cessation, the SSP 326 may send to the SCP 318 a disconnect message, e.g., a "T_Disconnect" (not shown), after the home telephone 302 disconnects.

Figure 12:
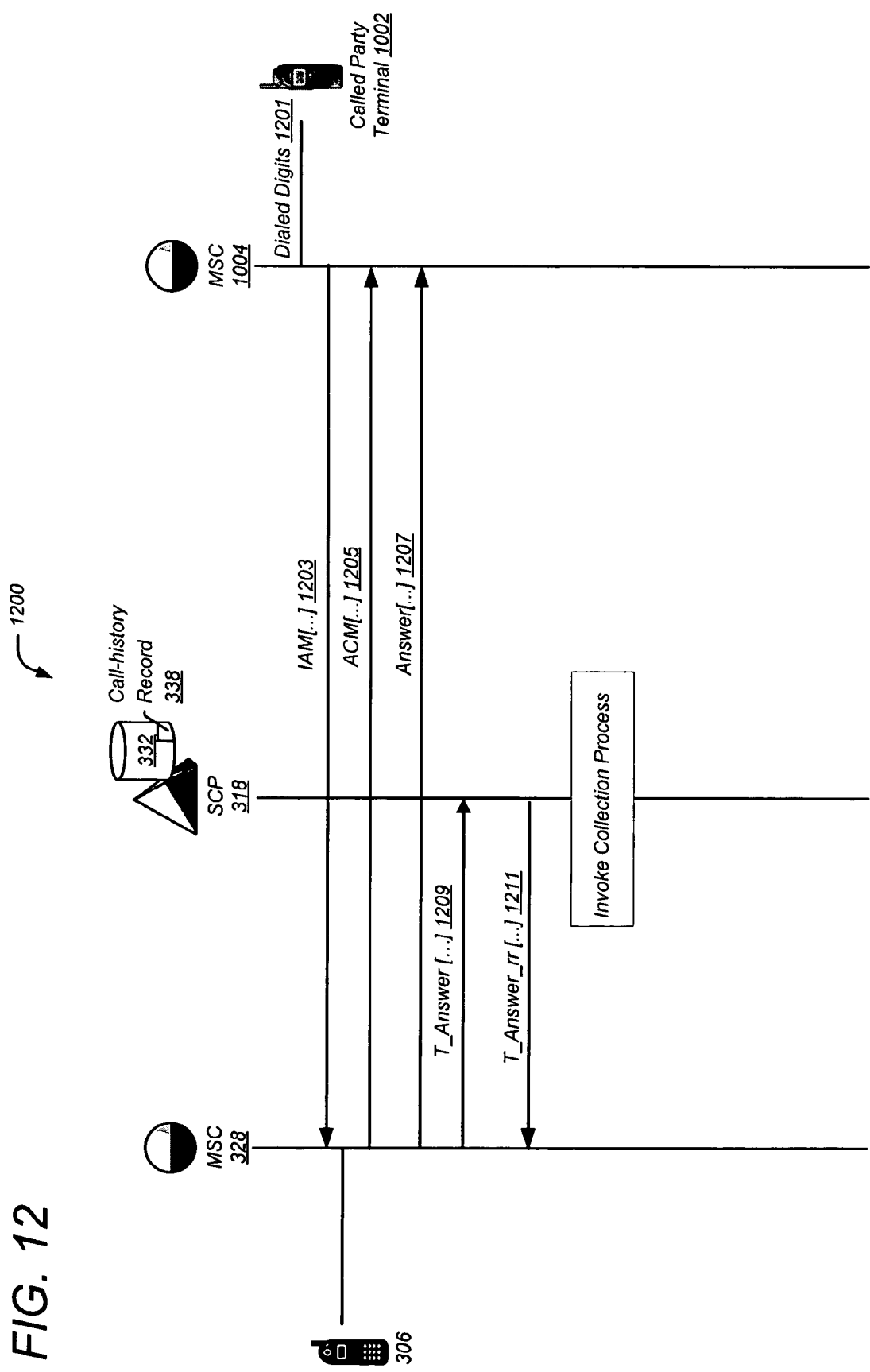
FIG. 12 is a ninth call-flow diagram illustrating an exemplary call invoking call-history collection when a voice call is terminated to a subscriber mobile station.

FIG. 12 is a simplified call flow diagram illustrating an exemplary call flow 1200 for invoking call-history collection when a voice call is terminated to the subscriber mobile station 306, which is already registered with public wireless network 314 and operating in its home coverage area. As one skilled in the art will recognize, the call flow 1200 may equally illustrate an exemplary for invoking call-history collection when a voice call is terminated to the subscriber mobile station 306 that is already registered with public wireless network 314 and roaming in the foreign portion thereof.

To start, a user enters into the called-party terminal 1002 a number of digits representative of the subscriber address associated with the mobile station 306 to initiate towards the mobile station 306 a call, and thus, call set-up. The called-party terminal 1002 then transmits a signal 1201 containing the dialed digits to the destination MSC 1004 via a BTS (not shown).

During the call set-up, the MSC 1004 transmits to the MSC 328 an ISUP IAM 1203 to reserve a network path between itself and the MSC 328. The MSC 328 may then transmit (i) a signal set to page and alert the mobile station 306, and (ii) an ISUP ACM message 1205 to the MSC 1004 to acknowledge that a network path is reserved. Once the called party answers the page by going "off-hook," the MSC 328 sends an ISUP Answer message 1207 to the destination MSC 1004. Upon processing of the Answer Message 1207, the call set-up is complete between the mobile station 306 and called-party terminal 1002. Once complete, voice content can be exchanged.

In addition to ISUP Answer message 1207, the MSC 328 may transmit to the SCP 318 a termination-answer ("T_Answer") message 1209 to notify the SCP 318 that the mobile station 306 has answered a call. In response to the T_Answer message 1209, the SCP 318 invokes the collection process. The collection process is then operable to continuously or periodically store in the call-history data record 332 a timestamp indicative of the time at which (i) the termination attempt is initiated, (ii) the termination attempt fails, (iii) the time the termination successfully completes, (v) the time the voice call ends, and/or (v) any time in between. Like above, the call-history information may be collected and stored in the call-history data record 338 in real time because the destination MSC 328 is in the voice call path.

In addition to invoking the collection process, the SCP 318 returns a T_Answer return result ("T_Answer_rr") message 1211 to the destination MSC 1004. After the mobile station 306 or the called-party terminal 1002 disconnects, the voice call is torn down using well known methods. Once torn down, the collection service typically stops collecting call-history information. Like above, the SSP 326 may send to the SCP 318 a disconnect message, e.g., a "T_Disconnect" (not shown) to facilitate cessation of collecting the call-history information after the mobile station 306 disconnects.

As noted above, the call-history data record 338 may be used to, for each of the subscriber addresses, call-history information for each (i) origination and termination attempt, (ii) origination and termination completion, (iii) completed voice call, and (iv) any other time in between. Such collection may generate a significant amount of information, which can cause processing delays and overrun storage capacities. While, theoretically, the collection of the call-history information for all the situations (i)-(iv) for each of the subscriber addresses may be maintained in the call-history data record 338, much of the information becomes less valuable for facilitating the dynamic-routing service as it ages.

Aging call-history information (e.g., greater than a couple of hours old or greater than the last 30 entries) may instead undergo predictive statistical analysis, e.g., statistical trend analysis, which allows the underlying aging call-history information to be discarded or stored in a long-term archive data store (not shown). Maintaining a certain period, e.g., several months, of call-history information in the long-term archive data store may be beneficial for performing statistical analysis and developing rules for the dynamic-routing service, as described in more detail below. The predictive statistical analysis may be supplemented with current call-history information to ensure that the statistical analysis remains up to date. Other schemes may be use to reduce the amount of call-history information stored in the call-history data record 338 as well.

Dynamic Routing Service Rules

Figure 13:
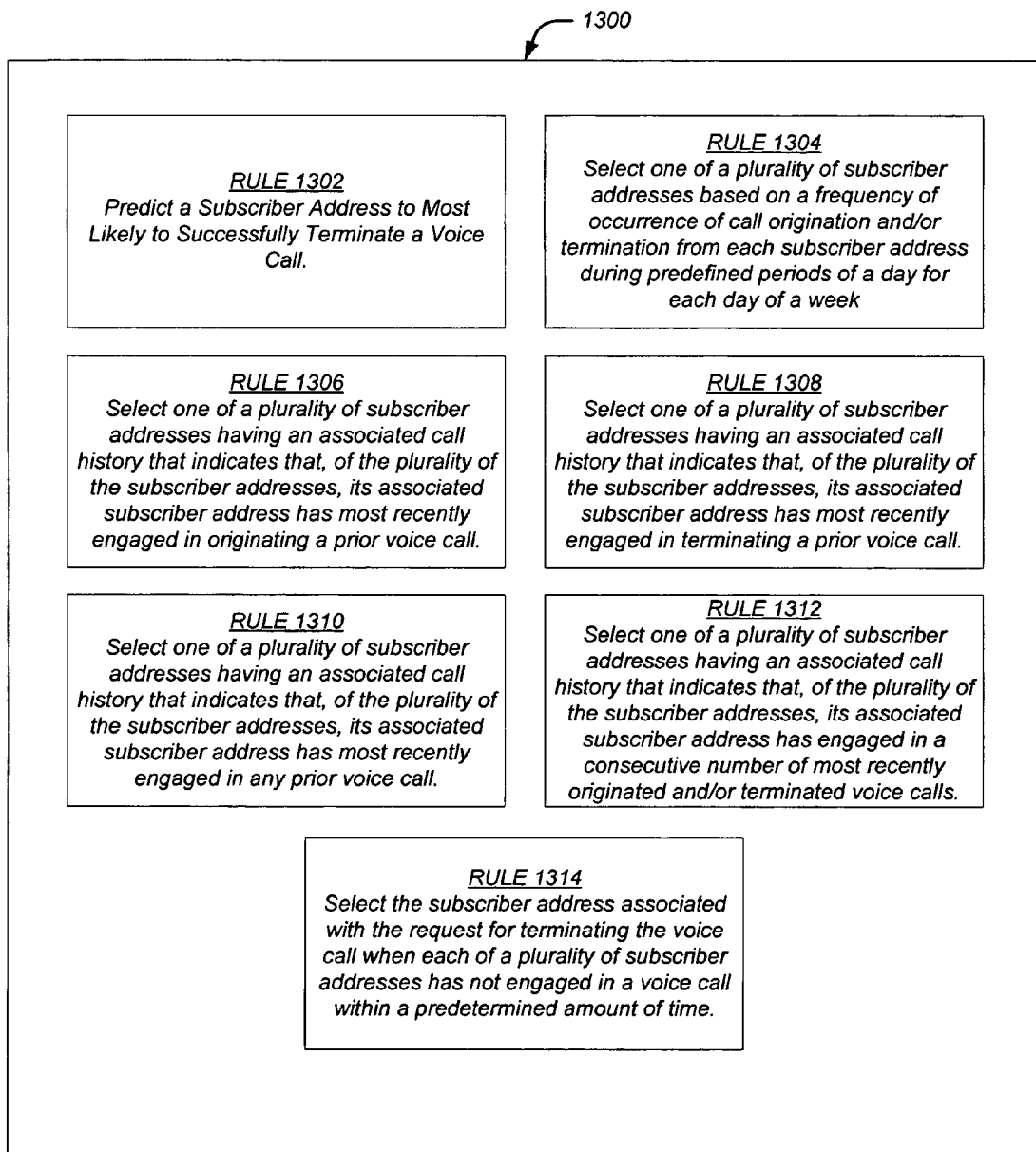
FIG. 13 is a third block diagram illustrating a battery of rules used by a rules-based engine to carry out a dynamic-routing service.

FIG. 13 is a block diagram illustrating a battery of rules 1300, namely rules 1302-1314, used by a rules-based engine, such as the rules based engine 336, for carrying out the dynamic-routing service. As noted above, the rules-based engine 336 uses one or more the rules 1302-1314 to determine the delivery address. Each of the rules 1302-1314 includes criteria to assist in making such determination.

Rule 1302 may include criteria to predict which one of the subscriber addresses is most likely to successfully terminate a voice call. To facilitate such prediction, the criteria of rule 1102 may be predicated on statistical trend analysis or other normalizing analysis of aging or current call-history information. The statistical trend or other normalizing analysis may be used to determine call patterns, i.e., when during each day each of the subscriber addresses has historically originated or terminated voice calls.

Assume, for example, that the statistical trend or other normalizing analysis of the call-history information indicates that the work telephone 304 historically originates or terminates a supermajority (e.g., 95%) of voice calls between 9:00 a.m. and 5:00 p.m. When employing rule 1302, the rules based engine 336 will select the subscriber address of the work telephone 304 if the SCP 318 receives, between the hours of 9:00 a.m. to 5:00 p.m., a request to terminate a voice call to one of the subscriber addresses. This is because the statistical trend analysis indicates with a given degree of confidence that the subscriber address of the work telephone 304 is the subscriber address most likely to successfully terminate a voice call during such hours.

Rule 1304 may include criteria to select one of the subscriber addresses based on a frequency of occurrence of call origination and/or termination from each subscriber address during predefined periods of a day for each day of a week. For example, the criteria of the rule 1104 may be predicated on a histogram that contains the frequency of occurrence of call origination and/or termination for each subscriber address for the periods shown in TABLE 1 below. The entries in TABLE 1 are for example only and not intended to exhausting or inflexible list of entries. Current and aged call-history information for each of the subscriber addresses may be used to populate the entries in TABLE 1 to determine frequency of occurrence of call origination and/or termination for each of the subscriber addresses.

When employing rule 1304, the rules-based engine 336 will refer to the 12:00 a.m. to 6:00 a.m. period and select subscriber address associated with the highest frequency of occurrence of call origination and/or termination if and the SCP 318 receives a request to terminate a voice call to one of the subscriber addresses at 2:00 a.m. on a Thursday.

TABLE 1

| Predefined Periods | Day | | | | | | | Subscriber Address |
|---|---|---|---|---|---|---|---|---|
| | Sun | Mon | Tue | Wed | Thur | Fri | Sat | |
| 6:00 a.m. to 8:00 a.m. | | | | | | | | 302 |
| | | | | | | | | 304 |
| | | | | | | | | 306 |
| 8:00 a.m. to 9:00 a.m. | | | | | | | | 302 |
| | | | | | | | | 304 |
| | | | | | | | | 306 |
| 8:00 a.m. to 9:00 am | | | | | | | | 302 |
| | | | | | | | | 304 |
| | | | | | | | | 306 |
| 9:00 a.m. to 6:30 p.m. | | | | | | | | 302 |
| | | | | | | | | 304 |
| | | | | | | | | 306 |
| 6:30 p.m. to 8:00 p.m. | | | | | | | | 302 |
| | | | | | | | | 304 |
| | | | | | | | | 306 |
| 8:00 p.m. to 12:00 a.m. | | | | | | | | 302 |
| | | | | | | | | 304 |
| | | | | | | | | 306 |
| 12:00 a.m. to 6:00 a.m. | | | | | | | | 302 |
| | | | | | | | | 304 |
| | | | | | | | | 306 |

Rule 1306 may include criteria to select the subscriber address having an associated call history that indicates that, of the plurality of the subscriber addresses, its associated subscriber address has most recently engaged in originating a prior voice call. When employing rule 1306, the rules-based engine 336 evaluates the call-history data record 338 to determine which one of the subscriber addresses has most recently engaged in originating a prior voice call.

Rule 1308 may include criteria to select the subscriber address having an associated call history that indicates that, of the plurality of the subscriber addresses, its associated subscriber address has most recently engaged in terminating a prior voice call. When employing the rule 1308, the rules-based engine 336 may evaluate the call-history data record 338 to determine which one of the subscriber addresses has most recently engaged in terminating a prior voice call.

Rule 1310 may include criteria to select the subscriber address having an associated call history that indicates that, of the plurality of the subscriber addresses, its associated subscriber address has most recently engaged in any prior voice call. Rule 1310 is somewhat of a combination of rules 1306, 1308. Thus, when employing rule 1310, the rules-based engine 336 may evaluate the call-history data record 338 to determine which one of the subscriber addresses has most recently engaged in originating or terminating a prior voice call.

Rule 1312 may include criteria to select the subscriber address having an associated call history that indicates that, of the plurality of the subscriber addresses, its associated subscriber address has engaged in a consecutive number of most recently originated and/or terminated voice calls. For example, the call-history data record 338 may indicate that the home telephone 302 may have engaged in the last five originated and terminated voice calls. When employing rule 1312, the rules-based engine 336 may evaluate the call-history data record 338 to determine which one of the subscriber addresses has engaged in a consecutive number of most recently originated and/or terminated voice calls.

Rule 1314 may include criteria to select the subscriber address associated with the request (i.e., "called party address") for terminating the voice call when the call-history data record 338 indicates that each of the subscriber addresses has not engaged in a voice call within a predetermined amount of time. Thus, when employing rule 1314, the rules-based engine 336 may evaluate the call-history data record 338 to determine if each of the subscriber addresses has not engaged in a voice call within a predetermined amount of time, and if so, selecting the called party address as the delivery address.

The rules 1302-1314 are not intended to be an exhausting or inflexible list of rules, but rather, an illustration of the breadth of rules that may be used in determining the delivery address. Other rules may be used as well for determining the delivery address.

Moreover, the rules may be hierarchically or selectively ordered. For example, the rules may be arranged such that rule 1302 on is carried out in workdays, and rule 1304 is carried out on non-workdays. As an alternative, the rules-1302-1314 may be arranged in a specific order, e.g., rule 1302-first, 1304-second, 1312-third, etc. Based on the specific order, the rules-based engine 336 may carry out rules 1302 first, and if the voice call is not successfully terminated, then carry out rule 1304, and so on.

Dynamic-Routing Service

Figure 14:
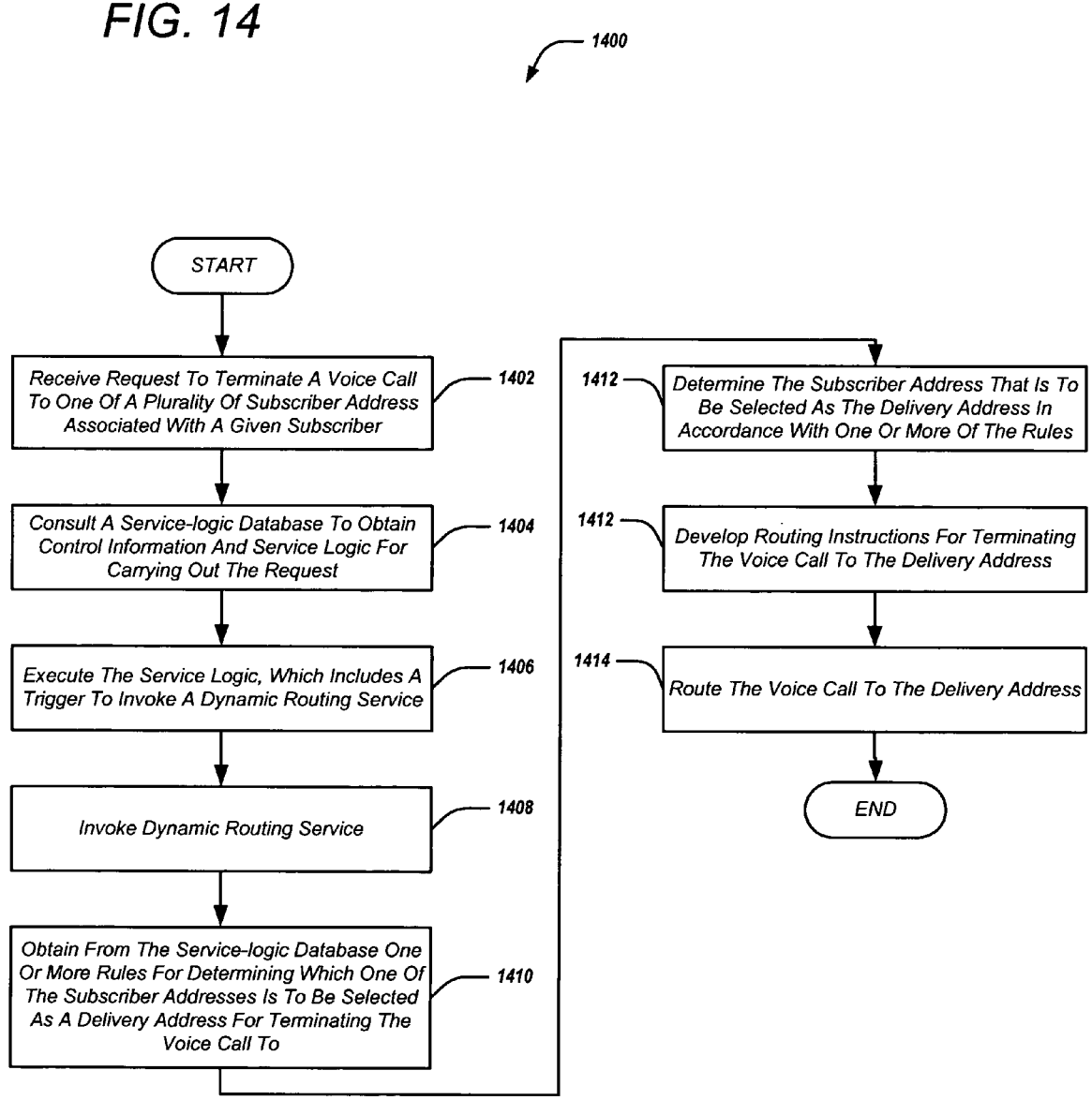
FIG. 14 is a second flow diagram illustrating a flow for carrying out a dynamic-routing service.

FIG. 14 is a flow diagram illustrating a flow 1400 for carrying out the dynamic-routing service for routing voice calls to one of the plurality of subscriber addresses that are associated with the given subscriber of the telecommunications network. Thus, with reference to FIG. 3, the SCP 318 receives a request for routing instructions for terminating a voice call to one to the subscriber addresses associated with home telephone 302, work telephone 304, and/or the mobile station 306, as shown in block 1402. The request may be originated from any of the elements of the telecommunications network 300.

Responsive to the request, the SCP 318 consults the service-logic database 332 to obtain control information and service logic for responding to the request, as shown in block 1404. This control information and service logic contains a trigger to invoke the dynamic-routing service.

At block 1406, the SCP 318 then executes the service logic. Detecting the trigger, the SCP 318 invokes the dynamic-routing service, as shown in block 1408. This causes the rules-based engine 336 to obtain from service-logic database 332 one or more rules for determining which one of the subscriber addresses associated with the home telephone 302, the work telephone 304, and the mobile station 306 is to be selected as the delivery address, as shown in block 1410.

The SCP 318 then determines the subscriber address that is to be selected as the delivery address in accordance with one or more of the rules, such as rules 1302-1314, as shown in block 1412. After the delivery address is determined, the SCP 318 develops the routing instructions for terminating the voice call to the delivery address, as shown in block 1414. At block 1416, the SCP 328, via its service logic, provides the routing instructions for terminating the voice call to the delivery address.

CONCLUSION

In the foregoing detailed description, numerous specific details are set forth in order to provide a thorough understanding of exemplary embodiments described herein. However, it will be understood that these embodiments may be practiced without the specific details. In other instances, well-known methods, procedures, components, and structural entities have not been described in detail, so as not to obscure the foregoing description.

In view of the wide variety of embodiments to which the principles of the present invention can be applied, it should be understood that the illustrated embodiments are exemplary only, and should not be taken as limiting the scope of the present invention. In the embodiments described above, the nodes, terminal, devices, and systems may include computing systems, controllers, and other devices containing processors. These devices may contain at least one Central Processing Unit ("CPU") and a memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigured or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system.

Furthermore, the method steps described herein may be taken in sequences other than those described, and more or fewer elements may be used in the block diagrams. The embodiments disclosed are for exemplary purposes only and other embodiments may be employed in lieu of or in combination with of the embodiments disclosed. Further, the claims should not be read as limited to the described order or elements unless stated to that effect. Therefore, all embodiments that come within the scope and spirit of the following claims and equivalents thereto are claimed as the invention.

I claim:

1. In a system that includes a service control point that is operable to provide routing instructions for a plurality of subscriber terminals associated with a given subscriber, wherein each of the plurality of subscriber terminals has a subscriber address and associated call history including an associated call origination history comprising at least one indication of when a prior voice call was originated from its associated subscriber address, a method for carrying out a dynamic-routing service for routing voice calls to one of the plurality of subscriber addresses comprising, in combination:

the service control point receiving a request for routing instructions for terminating a voice call to a called subscriber address of the plurality of subscriber addresses;

the service control point selecting from the plurality of subscriber addresses a delivery address for terminating the voice call to, wherein the selection of the delivery address is based on the call histories, including at least the call origination histories, associated with the plurality of subscriber addresses;

the service control point developing routing instructions for terminating the voice call to the delivery address; and the service control point providing, in reply to the request, the routing instructions for terminating the voice call to the delivery address.

2. The method of claim 1, wherein the delivery address is the called-subscriber address.

3. The method of claim 1, wherein the delivery address is not the called-subscriber address.

4. The method of claim 1, wherein the at least one indication of when a prior voice call was originated from its associated subscriber address is a timestamp.

5. The method of claim 1, wherein each of the call histories includes at least one indication of when a prior voice call was terminated to its associated subscriber address.

6. The method of claim 5, wherein the at least one indication of when a prior voice call was terminated to its associated subscriber address is a timestamp.

7. The method of claim 1, wherein the step of selecting a delivery address comprises:

predicting, as a function of call histories associated with the plurality of subscriber addresses, including at least the call origination histories, which one subscriber address of the plurality of subscriber addresses is most likely to successfully terminate a voice call; and setting the delivery address to such subscriber address.

8. The method of claim 7, wherein the step of predicting which one subscriber address of the plurality of subscriber addresses is most likely to successfully terminate a voice call comprises:

developing call patterns for each of the plurality of subscriber addresses by statistically analyzing the call histories associated with the plurality of subscriber addresses, and comparing the request for routing instructions to the call patterns to determine which one of the plurality of subscriber addresses is most likely to successfully terminate a voice call.

9. The method of claim 8, wherein each of the call histories includes a collection of indicators that indicate when, over a predetermined period of time, voice calls were originated from its associated subscriber address, wherein each of the call patterns indicates when its associated subscriber address has historically originated voice calls during a day, and wherein the step of comparing the request for routing instructions to the call patterns comprises:

comparing to each of call patterns when the request for routing instructions was received so as to determine which one of the call patterns best matches when the request for routing instructions is received; and selecting the subscriber address associated with such call pattern.

10. The method of claim 9, wherein each of the call histories includes a collection of indicators that indicate when, over a predetermined period of time, voice calls were terminated to its associated subscriber address, wherein each of the call patterns indicates when its respective subscriber address has historically terminated voice calls during a day, and wherein the step of comparing the request for routing instructions to the call patterns comprises:

comparing to each of call patterns when the request for routing instructions was received so as to determine which one of the call patterns best matches when the request for routing instructions is received; and selecting the subscriber address associated with such call pattern.

11. The method of claim 8, wherein each of the call histories includes a collection of indicators that indicate when, over a predetermined period of time, voice calls were terminated to its associated subscriber address, wherein each of the call patterns indicates when its respective subscriber address has historically terminated voice calls during a day, and wherein the step of comparing the request for routing instructions to the call patterns comprises:

comparing to each of call patterns when the request for routing instructions was received so as to determine which one of the call patterns best matches when the request for routing instructions is received; and selecting the subscriber address associated with such call pattern.

12. The method of claim 1, wherein each of the call histories includes indications of when and how many times voice calls were originated from its associated subscriber address, and wherein the step of selecting a delivery address comprises:

evaluating each of the call histories to determine how many times during predefined periods of a day each of the plurality of subscriber addresses originated a voice call, comparing to the predefined periods when the request for routing instructions was received so as to determine a designated period during which the request for routing instructions was received;

determining for the designated period which one subscriber address of the plurality of subscriber addresses originated a greatest number of voice calls; and setting the delivery address to such subscriber address.

13. The method of claim 1, wherein if two subscriber addresses of the plurality of addresses have originated an equal amount of voice calls during the designated period, then setting the delivery address to the either of the two subscriber addresses.

14. The method of claim 1, wherein each of the call histories includes indications of when and how many times voice calls were terminated to its associated subscriber address, and wherein the step of selecting a delivery address comprises:

evaluating each of the call histories to determine how many times during predefined periods of a day each of the plurality of subscriber addresses terminated a voice call, comparing to the predefined periods when the request for routing instructions was received so as to determine a designated period during which the request for routing instructions was received;

determining for the designated period which one subscriber address of the plurality of subscriber addresses terminated a greatest number of voice calls; and setting the delivery address to such subscriber address.

15. The method of claim 14, wherein if two subscriber addresses of the plurality of addresses have terminated an equal amount of voice calls during the designated period, then setting the delivery address to the either of the two subscriber addresses.

16. The method of claim 1, wherein the step of selecting a delivery address comprises evaluating each of the call histories to determine which one of the plurality of subscriber addresses has most recently engaged in a prior voice call; and setting the delivery address to such subscriber address.

17. The method of claim 1, wherein the step of selecting a delivery address comprises evaluating each of the call histories to determine which one of the plurality of subscriber addresses has most recently engaged in originating a prior voice call; and setting the delivery address to such subscriber address.

18. The method of claim 1, wherein the step of selecting a delivery address comprises evaluating each of the call histories to determine which one of the plurality of subscriber addresses has most recently engaged in terminating a prior voice call; and setting the delivery address to such subscriber address.

19. The method of claim 1, wherein the step of selecting a delivery address comprises evaluating each of the call histories to determine which one of the subscriber addresses has engaged in a consecutive number of most recently originated and terminated voice calls; and setting the delivery address to such subscriber address.

20. The method of claim 1, wherein the step of selecting a delivery address comprises evaluating each of the call histories to determine which one of the subscriber addresses has engaged in a consecutive number of most recently originated or terminated voice calls; and setting the delivery address to such subscriber address.

21. The method of claim 1, wherein the step of selecting a delivery address comprises evaluating each of the call histories to determine if each of the subscriber addresses has not engaged in a voice call within a predetermined amount of time, and if not, setting the delivery address to the called subscriber address.

22. The method of claim 1, further comprising collecting additional call history for at least one subscriber address when its associated subscriber terminal engages in a voice call.

23. The method of claim 1, further comprising collecting additional call history for at least one subscriber address when its associated subscriber terminal successfully terminates a voice call.

24. A method for carrying out a dynamic-routing service for routing voice calls to one of a plurality of subscriber terminals associated with a given subscriber, wherein each of the plurality of subscriber terminals has a subscriber address, the method comprising, in combination:

collecting a call history for each of the plurality of subscriber addresses, wherein the call history for each subscriber address includes an associated call origination history comprising at least one indication of when a prior voice call was originated from the subscriber address;

receiving a request for routing instructions for terminating a voice call to a called-subscriber address of the plurality of subscriber addresses;

selecting from the plurality of subscriber addresses a delivery address for terminating the voice call to, wherein the selection of the delivery address is based on the call histories, including at least the call origination histories, associated with the plurality of subscriber addresses;

developing routing instructions for terminating the voice call to the delivery address; and providing, in reply to the request, the routing instructions for terminating the voice call to the delivery address.

25. The method of claim 24, wherein the step of collecting the call history for each of the plurality of subscriber addresses comprises storing in each call history an indicator that indicates when its associated subscriber terminal engages in a voice call.

26. The method of claim 25, further comprising purging from each call history indicators older than a predetermined time.

27. The method of claim 21, further comprising purging from each call history at least one indication of a voice call origination older than a predetermined time.

28. The method of claim 24, wherein the step of collecting the call history for each of the plurality of subscriber addresses comprises storing in each call history an indicator that indicates when a voice call is terminated to the subscriber address associated with the call history.

29. The method of claim 28, further comprising purging from each call history indicators older than a predetermined time.

30. The method of claim 24, wherein the step of collecting the call history for each of the plurality of subscriber addresses comprises storing in each call history an indicator that indicates when its associated subscriber terminal successfully terminates a voice call.

* * * * *